US012423957B2

(12) United States Patent
Pal et al.

(10) Patent No.: US 12,423,957 B2
(45) Date of Patent: Sep. 23, 2025

(54) SYSTEMS AND METHODS FOR A LIGHTWEIGHT PATTERN-AWARE GENERATIVE ADVERSARIAL NETWORK

(71) Applicant: Ceremorphic, Inc., San Jose, CA (US)

(72) Inventors: Chandrajit Pal, Khandi (IN);
Manmohan Tripathi, Hyderabad (IN);
Govardhan Mattela, Hyderabad (IN)

(73) Assignee: Ceremorphic, Inc., San Jose, CA (US)

( * ) Notice: Subject to any disclaimer, the term of this patent is extended or adjusted under 35 U.S.C. 154(b) by 938 days.

(21) Appl. No.: 17/519,581

(22) Filed: Nov. 5, 2021

(65) Prior Publication Data
US 2023/0146468 A1     May 11, 2023

(51) Int. Cl.
| | | |
|---|---|---|
| *G06V 10/774* | (2022.01) | |
| *G06N 3/045* | (2023.01) | |
| *G06V 10/40* | (2022.01) | |

(52) U.S. Cl.
CPC ......... *G06V 10/7747* (2022.01); *G06N 3/045* (2023.01); *G06V 10/513* (2022.01)

(58) Field of Classification Search
CPC .. G06V 10/7747; G06V 10/513; G06V 10/82; G06N 3/045; G06N 3/08; G06N 3/082; G06N 3/084; G06N 3/047; G06N 3/088; G06N 7/01
See application file for complete search history.

(56) References Cited

U.S. PATENT DOCUMENTS

| | | | | |
|---|---|---|---|---|
| 11,017,019 | B1 * | 5/2021 | Hohwald | G06N 3/08 |
| 2020/0343985 | A1 * | 10/2020 | O'Shea | G06N 3/047 |
| 2021/0201003 | A1 * | 7/2021 | Banerjee | G06V 10/82 |

OTHER PUBLICATIONS

Xu al., "Joint Feature Synthesis and Embedding: Adversarial Cross-Modal Retrieval Revisited", pub. Dec. 17, 2020, in view of Hu et al., (hereafter HU), "SAC-Net: Spatial Attenuation Context for Salient Object Detection", pub. May 18, 2020. (Year: 2020).*
Hu et al., (hereafter HU), "SAC-Net: Spatial Attenuation Context for Salient Object Detection", pub. May 18, 2020. (Year: 2020).*
Qiu et al., "Deep Semantic Hashing with Generative Adversarial Networks", pub. Aug. 7-11, 2017 (Year: 2017).*
Chang et al., "Code-switching Sentence Generation by Generative Adversarial Networks and its Application to Data Augmentation" pub. Jun. 2019 (Year: 2019).*

(Continued)

*Primary Examiner* — Mekonen T Bekele
(74) *Attorney, Agent, or Firm* — File-EE-Patents.com; Jay A. Chesavage

(57) ABSTRACT

A computer-implemented method includes training at least a generative adversarial network, the method operable on one or more processors. The method includes at least (1) applying pattern extraction to a set of training data to extract one or more feature embeddings representing one or more features of the training data, (2) attenuating the one or more feature embeddings to create one or more attenuated feature embeddings, (3) providing the one or more attenuated embeddings to a generator of the generative adversarial network as a condition to at least partly control the generator in generating synthetic data, the providing being performed automatically and dynamically during training of the generator, and (4) with the generator, generating synthetic data based at least in part on the attenuated embeddings.

21 Claims, 23 Drawing Sheets

(56) References Cited

OTHER PUBLICATIONS

Graziani M. et al., "Concept attribution: Explaining CNN decisions to physician", pub. Jun. 17, 2020, Graziani M. et al., (Year: 2020).*

Zhengqing Fang et al., "Concept-based Explanation for Fine-grained Images and Its Application in Infectious Keratitis Classification", pub. Dec. 16, 2020, to (Year: 2020).*

Gonda et al., "An Interactive Approach to Train Deep Neural Networks for Segmentation of Neuronal Structures", Pub. 2017, (Year: 2017).*

* cited by examiner

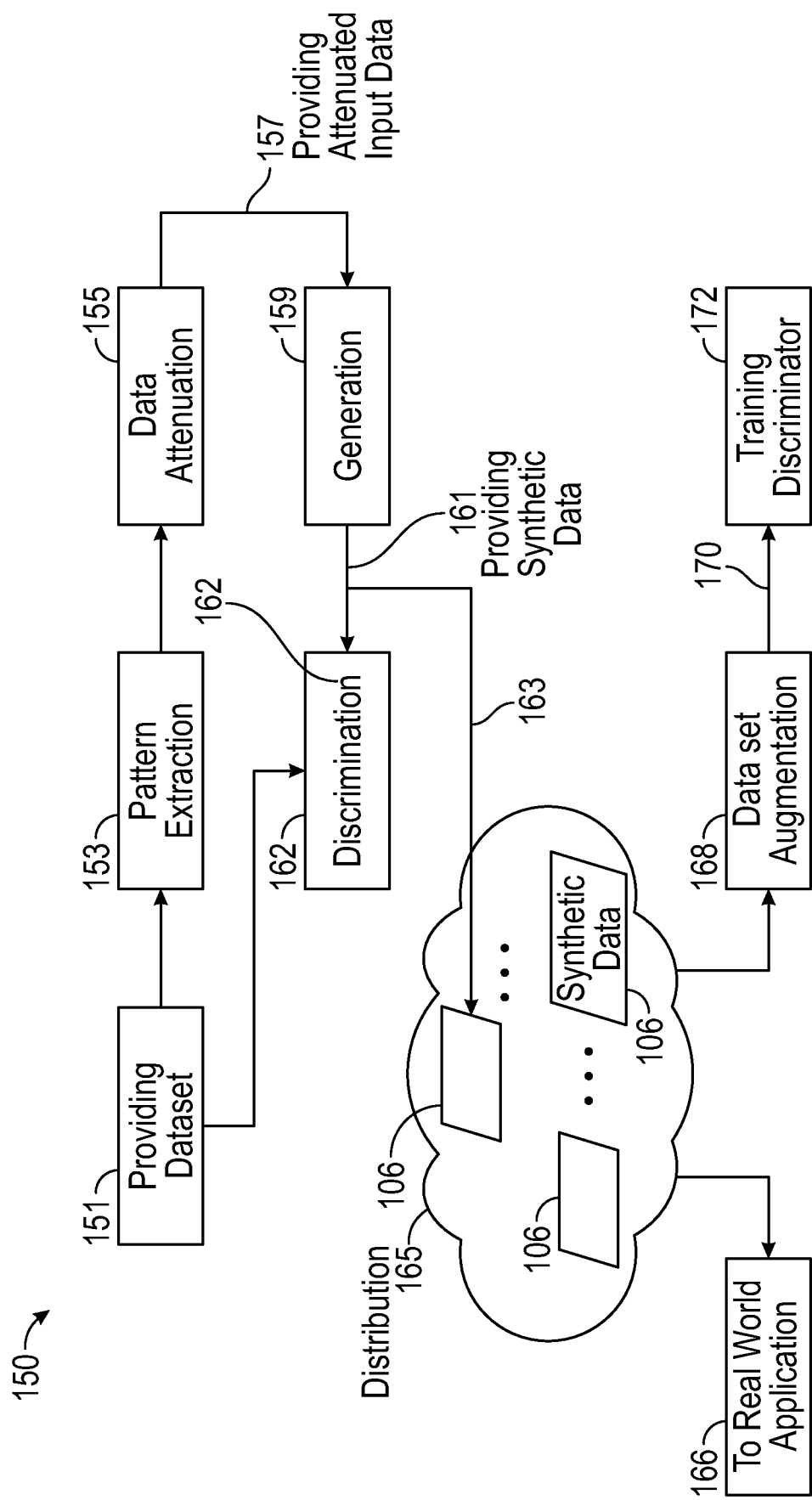

a) Feature Drop Rate: 10% b) Feature Drop Rate: 25% c) Feature Drop Rate: 40% d) Feature Drop Rate: 50%

900 ⟶

| Original | | Original+ Augmented with RFS | Original+ Augmented with IWGN |
|---|---|---|---|
| Total no of Images Used | Test set Accuracy (%) | Test set Accuracy (%) | Test set Accuracy (%) |
| 15 | 58.26 | 63.60 | 68.787 |
| 25 | 63.985 | 74.93 | 76.73 |
| 50 | 73.46 | 76.92 | 78.89 |
| 100 | 79.99 | 81.11 | 82.520 |
| 300 | 82.81 | 83.93 | 84.35 |

FIG. 9

SYSTEMS AND METHODS FOR A LIGHTWEIGHT PATTERN-AWARE GENERATIVE ADVERSARIAL NETWORK

FIELD OF TECHNOLOGY

Embodiments relate to systems and methods for a lightweight generative adversarial network for sparse datasets. Some particular embodiments relate to a lightweight adversarial network for sparse datasets with a pattern extractor for extracting feature embeddings from the sparse dataset for use by a generator of a generative adversarial network.

BACKGROUND

Neural networks are a branch of artificial intelligence that are inspired by human neural networks. In particular, neural networks are a type of deep learning model. The use of neural networks includes two stages: 1) training; and 2) inference. Training a neural network usually includes providing substantial amounts of training data to a neural network during a training phase. Inference is putting a trained neural network to work to perform a task.

One type of neural network is a generative adversarial network (GAN). A GAN includes at least a generator and a discriminator. A generator outputs synthetic data, such synthetic images. The synthetic data is computer-generated data, including images, that are not real. A trained generator can provide as output synthetic data that is different from but difficult to distinguish from real data. That is, a trained generator outputs a synthetic image of a face that is not the face of a real person. Yet, the synthetic image looks similar to but different from a face of an actual person. A discriminator attempts to distinguish between the synthetic data from the generator and real data. The discriminator is trained with training data, such as data from a dataset. The discriminator also trains the generator to generate synthetic data that could fool the discriminator.

There are different types of GAN's. One way some GANs differ from others is in how much control they exert on the output of a generator. For example, an unconditioned GAN does not provide input that controls the output of generator. An unconditioned GAN provides the generator with latent input, such as random data or a latent vector distribution. Based on the latent input, the generator generates synthetic data such as fake images. The generator learns by feedback from the discriminator. If the discriminator can correctly determine that a data item is synthetic data rather than a real data, the generator receives that feedback and learns to produce more convincing synthetic data until it can fool the discriminator. Once the generator is trained, then in inference the generator can produce synthetic images that are useful for a practical purpose. Because the generator receives only latent input, the generator's output is based on the feedback from the discriminator.

Another type of GAN is a conditional GAN. The aim is to further control the output of the generator by providing generator with additional data that is referred to as conditioning data. The conditioning data is often class labels indicating a class that data belongs to or data from a different modality. The generator is thus at least partly controlled in producing synthetic data.

SUMMARY

In some embodiments a computer-implemented method includes training at least a generative adversarial network, the method operable on one or more processors. the method includes at least (1) applying pattern extraction to a set of training data to extract one or more feature embeddings representing one or more features of the training data, (2) attenuating the one or more feature embeddings to create one or more attenuated feature embeddings, (3) providing the one or more attenuated embeddings to a generator of the generative adversarial network as a condition to at least partly control the generator in generating synthetic data, the providing being performed automatically and dynamically during training of the generator, and (4) with the generator, generating synthetic data based at least in part on the attenuated embeddings.

BRIEF DESCRIPTION OF THE DRAWINGS

Representative embodiments are is illustrated by way of example and not by limitation in the accompanying figures, in which:

FIG. 1B is a flow diagram illustrating an exemplary method of operating a generative adversarial network, consistent with some embodiments.

FIG. 9 is a table illustrating some data derived from experiments performed with one or more embodiments.

Figure 1A:
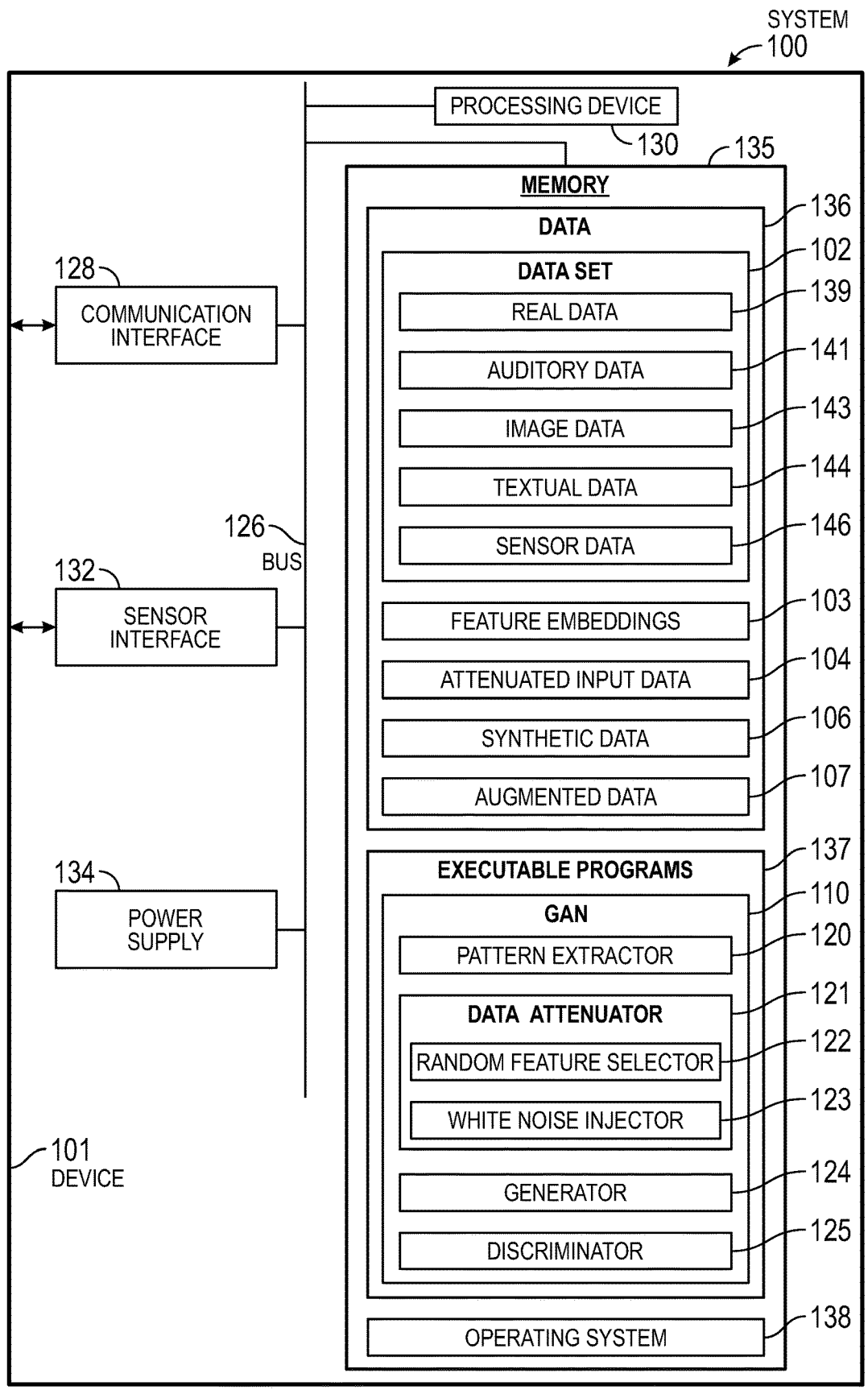
FIG. 1A is a block diagram illustrating a system in which some embodiments may be implemented.

Skilled artisans appreciate that elements in the Figures are illustrated for simplicity and clarity and have not necessarily been drawn to scale. For example, the dimensions of some of the elements in the Figures may be exaggerated relative to the other elements to improve understanding of the embodiments of the present invention.

DETAILED DESCRIPTION

It is to be understood that the disclosed embodiments are merely exemplary of the invention, which may be embodied in various forms. It is also to be understood that multiple references to "some embodiments" are not necessarily referring to the same embodiments.

As used in this document, the term "resource-constrained edge device" includes at least one of an Internet of Things device (IOT device), an embedded computing device, or a device with limited processing and limited storage capabilities that utilizes what is known by those of skill in the art as a microcontroller (MCU). Resource-constrained edge devices are effective where, for example, real-time processing of data is required. The term "edge device" is also used and includes its ordinary meaning in the art. In particular, use of "edge device" refers to computing devices that are in close network connectivity proximity to sources of data such as real-time or streamed data, whether from users or from sensors. Examples of edge devices include, without limitation, resource-constrained edge devices, smart telephones, hand-held computing devices, smart cameras, and the like.

As used in this document, the term "real data" is used for its ordinary meaning and includes data that is, at least in part, not synthetic data. For example, data from a sensor that measures a real world condition is real data as is an image of a person's face captured with a camera. As another example, a recording of a person singing is also real data.

As used in this document, the term "synthetic data" is used to describe data that is not real data, such as computer-generated image of a face that is not the face of any real person. Synthetic data is used as a counterpoint to real data. A computer-generated audio of an artificially synthesized voice singing would also be synthetic data. As relevant here, synthetic data is generated by a generator of a GAN.

As used in this document, the term "sparse data" or "sparse dataset" refers to data which either as a whole or for specific classes lacks sufficient data to avoid one or more of imbalanced classes, underdetermined parameters, or poor generalization. For example, some classes of data may lack sufficient data.

As used in this document, a dataset is a set of data that includes at least some training data.

As used in this document, "online/incremental learning" refers to its ordinary meaning in the art and includes causing a deep learning model to be adapted to a changing environment on the fly, such as where training data is dynamic and changing dependent on one or more environmental parameters. For example, online/incremental learning is applicable where an entire dataset of training data is not available at once but is instead training data is received in parts, in real-time, such as data from active sensors or from users. As used in this document, "on the fly" refers to its ordinary use in the art and includes at least one of performing something during computational run time, during execution of a computer program without halting execution of the computer program, or as otherwise understood in the art.

Part One

Deep learning models, such as neural networks, have gained success due to availability of proficient training data, reductions in storage costs, and availability of powerful computing hardware. As noted above, a dataset is a set of data that can include at least some training data.

Training data is sometimes also called sample data because it is a sample of a larger universe of data. Ideally, the training data is representative of this larger universe of data. Training data is often parsed with classes of data, which are categories or subsets of the training data. The availability of proficient training data includes access to well sampled and clean datasets with sufficient data samples per class and with sufficient data variation to capture true data distributions, that is to capture the distribution of the larger universe of data.

If insufficient training data is available, for example if a dataset used for training has insufficient data, then there is sparse data regime. The sparse data regime results in one or more of unbalanced classes, undetermined parameters, poor generalization of trained neural networks, or other difficulties.

As a result, data augmentation techniques have been developed as a way to compensate for sparse data regimes. Data augmentation alleviates sparse data by at least one of using the available data more effectively or providing additional data. However, traditional data augmentation techniques cause a generator to produce only limited plausible additional data.

Generative adversarial networks (GANs) offer a way to unlock additional data from a dataset by generating synthetic data with the appearance of real data. For example, a GAN may generate synthetic images with the appearance of real images. The synthetic data may be added to a sparse dataset to provide an augmented dataset for training. The augmented dataset likely has greater variety of data, more balanced classes, and greater amounts of data for better training results, such as avoidance of overfitting and greater data generalization.

In an unconditional GAN, the input to the generator does not control the synthetic data generated by the generator. An unconditional GAN often provides latent input to a generator. The latent input does not control synthetic data output by the generator. The latent input may be, for example, random input.

Conditional GANs provide conditioning data as input to the generator to at least partly control the generator. The conditioning data is often class labels or data from a different modality. The conditional GAN thus at least partly controls a generator in producing synthetic data. The conditional GAN may then combine the synthetic data with sparse data to create augmented data. The augmented data at least partly addresses the sparse data regime described above. However, the labeling of classes to create class labels is a manual process. The feeding of the labels or the different modality data to the generator also includes manual operations.

Sparse data sometimes results from sensors, users, or other sources of real-time data that produce data in streams or small batches. For example, a farmer taking photographs of diseased plants with a smartphone camera (possibly with low resolution) likely only captures a relatively small number of images compared with a number of images typically used to train neural networks. Thus, a sparse data regime results. There are advantages to having the captured images analyzed and classified on the smartphone itself. Some advantages, for example, are greater responsiveness and having the processing of the sparse data closer to the source of the sparse data. Thus, there is a need for a handheld device, other mobile device, or other edge device that can operate a GAN to generate synthetic images to supplement for the sparse data.

As a further example, a sensor may only send small batches of data spread over a period of time to an Internet of Things (IoT) device. A given batch of sensor data may have a low amount of data compared to an amount of data typically used to train neural networks. Thus, a sparse data regime results. There are advantages to having the batch of sensor data analyzed and classified on the IoT device itself. Some advantages, for example, are greater responsiveness and having the processing of the sparse data closer to the source of the sparse data. Thus, there is a need for a IoT device, or other resource-constrained edge device, that can operate a GAN to generate synthetic data to supplement the sparse data.

Thus for some embodiments, a possible design consideration is the ability to train and execute a GAN on a resource constrained edge device, a mobile device, a smartphone, a small battery-powered device, or a handheld device. For example, for some particular embodiments a possible design consideration is reducing the processing and memory requirements for devices that are close to the source of data. By being able to work with a limited dataset, these embodiments can be optimized to a small size, thereby reducing compute intensive and memory intensive operations.

Thus, for some embodiments, a possible design consideration is to automate at least some manual processes for controlling a generator. For some embodiments, a possible design consideration is to provide for additional control of generators beyond that provided by the use of class labels or the use of different modality data.

Not all design considerations are applicable to all or even most embodiments. For example, some embodiments can beneficially operate on servers and high-powered cloud systems that are not resource-constrained. As a further example, in some embodiments, some operations may not be automated.

Feature embedding (or feature extraction) refers to a form of data reduction such as by selecting data subsets with the objective of providing more effective machine learning. In some embodiments, one or more computing devices extract data from a dataset as one or more feature embeddings that are associated with one or more features of data in the dataset. In some embodiments, the one of more computing devices represent the one or more feature embedding as one or more vectors. The one or more computing devices then feed the one or more feature embeddings as input to a generator. That is, the one or more computing devices feed at least some of the extracted data to the generator as one or more conditions to control the generator. The dataset may be regarded as containing "real data" as contrasted with "synthetic data" to be generated with the generator. In some embodiments one or more computing devices perform the extracting and the feeding operations automatically.

In some embodiments, the dataset includes at least image data. In some embodiments, the dataset includes at least one of audio data, sensor data, or text data.

In some embodiments, before feeding the one or more feature embeddings to the generator, one or more computing devices attenuate the extracted data to create attenuated data. In some embodiments the one or more computing devices attenuate the extracted data by performing random feature selection (RFS) by randomly selecting a subset of the feature embeddings and discarding the non-selected feature embeddings. Thus, the one or more computers create attenuated data. The one or more computing devices then feed the attenuated data to the generator as one or more conditions to at least partly control the synthetic data generated by the generator. In some further embodiments, the one or more computing devices perform the selecting of the subset of feature embeddings stochastically. In some further embodiments the one or more computers perform the selecting and the feeding automatically.

In some embodiments the one or more computing devices attenuate the extracted data by mixing the extracted data with additive white Gaussian noise to create attenuated data. The one or more computing devices then feed the attenuated data to the generator as one or more conditions to at least partly control output of the generator. In some further embodiments the one or more computers perform the mixing and the feeding automatically.

One or more benefits may be realized from at least some of the one or more above-described embodiments. For example, in some embodiments the use of the attenuated data causes a generator to produce synthetic data similar to, but different from, real data from the dataset. For example, synthetic images generated by the generator are similar to, but different from, real images from which the dataset. The synthetic data has a distribution that is similar to a distribution of the real data.

The similarity of the distribution of the synthetic data to the distribution of the real data arises because the feature embeddings in the attenuated data contains some features, but not all features, from the dataset. The generator therefore generates synthetic data containing partial information from the true distribution of the dataset. That is, the use of the attenuated data increases the likelihood that the generator will generate a variety of synthetic data that is approximately similar to but different from the real data. This makes the synthetic data more useful. For example, if the synthetic data is added to the real data to create a more varied dataset for training purposes. Or, for example, if the synthetic data is used for a real world use, such as for example producing CAPTCHA's, a more varied set of CAPTCHA's is produced.

As discussed above, one or more computing devices may combine the synthetic data generated by the generator with real data from the dataset to create an augmented dataset. The augmented dataset provides a more complete dataset for training the discriminator.

Therefore, the above-described embodiments achieve greater data regularization and avoid overfitting. In testing, some embodiments achieved a performance gain of 13% on MNIST and eMNIST datasets. Also achieved was a trained model size of 3.2 megabytes, which is small enough to transfer to at least some resource-constrained edge devices.

The MNIST and eMNIST are well-known large databases containing images of handwritten digits. They are widely used for reference or for machine learning training. As of the time this document was written, the above datasets were available from the National Institute of Standards and Technology (NIST) at the following website: (www.nist.gov/itl/products-and-services/emnist-dataset Thus, in some embodiments, a computer-implemented method includes training at least a generative adversarial network. the method operable on one or more processors, the method includes at least (1) applying pattern extraction to a set of training data to extract one or more feature embeddings representing one or more features of the training data, (2) attenuating the one or more feature embeddings to create one or more attenuated feature embeddings, (3) providing the one or more attenuated embeddings to a generator of the generative adversarial network as a condition to at least partly control the generator in generating synthetic data, the providing being performed automatically and dynamically during training of the generator, and (4) with the generator, generating synthetic data based at least in part on the attenuated embeddings.

In some embodiments, there is a computer-implemented method for generating synthetic data from a sparse dataset, the method operable on one or more processors. The method includes at least (1) providing a generative adversarial network that includes at least: (a) a pattern extractor that receives the sparse dataset, (b) a data attenuator linked to the pattern extractor, (c) a generator linked to the extractor, and (d) a discriminator linked to the generator, (2) extracting, via the pattern extractor, feature embeddings from the sparse dataset (3) attenuating the feature embeddings via the data attenuator to create attenuated data configured to be a condition for the generator, (4) generating, with the generator, the synthetic data based on the attenuated data, and (5) transmitting the synthetic data to the discriminator.

Referencing FIG. 1A, a block diagram shows a simplified system 100 in which some embodiments may be practiced. System 100 depicts a device 101 that in some embodiments includes one or more of a smartphone, a laptop computer, a server, an IoT device, or some other computing device. Although FIG. 1A depicts system 100 as including a single device 101, in some embodiments system 100 may include one device or a plurality of devices. Device 101 includes a processing device 130, a memory 135, a communication interface 128 for sending or receiving communications, a sensor interface 132, a power supply 134, and a bus 126 communicably connecting all of the above.

Turning to processing device 130, in some embodiments this is a single processing device and in some other embodiments processing device 130 includes a plurality of processing devices, including processing devices of different types. For example, dependent on the particular embodiment processing device 130 may include any combination of one or more processors (CPU's), one or more controllers, one or more graphics processing units (GPU's), one or more application-specific-circuits (ASICs), or one or more other types of processing devices. In some embodiments two of more of the processing devices may be configured to perform parallel computations. In some embodiments the processing device 130 is an MCU, discussed above.

Although FIG. 1A depicts memory 135 as a single memory in a single device 101, in some embodiments there could be multiple memories of different types distributed among two or more devices. In some embodiments, there can be a single device with multiple processing devices, each of which is associated with a different memory. In some embodiments, there can be a single device with multiple processing devices, wherein at least some of the multiple processing devices are associated with a single shared memory. Memory 135 could, in some embodiments, include one or more of a cache memory, a random-access memory (RAM), a read-only memory (ROM), a hard drive, a flash memory, or a removable memory. In some embodiments, memory 135 is one or more non-transitory media bearing one or more executable instructions that may cause processor 130 to perform one or more operations.

Subject to the above, in some embodiments memory 135 includes data 136, executable programs 137 and an operating system 138. The data 136 illustrated are examples only and the types of data shown may not apply to all embodiments. As depicted in FIG. 1A, memory 135 includes a dataset 102 for input to a generative adversarial network, feature embeddings 103 extracted from the dataset 102, attenuated input data 104 for feeding to a generator of a generative adversarial network, synthetic data 106 generated by a generator of a generative adversarial network, and an augmented dataset 107 which is a mix of synthetic data 106 and the original dataset 102. In some embodiments, dataset 102 is a sparse dataset. In some embodiments, ash shown, dataset 102 includes real data 139 that a discriminator will attempt to distinguish from the synthetic data 106, auditory data 141, image data 143, textual data 144, and sensor data 146.

Memory 135 further includes executable programs 137 which includes a generative adversarial network 110 (GAN). The GAN 110 includes a pattern extractor 120 for extracting data from dataset 102, a data attenuator 121 for attenuating the feature embeddings 103 to create attenuated input data 104, a generator 124, and a discriminator 125. Data attenuator 121 includes at least random feature selector 122 for selecting a random subset of feature embeddings 103 and white noise injector 123 which injects additive white Gaussian noise into the feature embeddings 103. Memory 135 further includes operating system 138, such as for example Linux.

Referencing FIG. 1B, a method 150 includes operation 151 of providing a dataset 102. The dataset 102 may include training data for training the discriminator 125. In some embodiments the dataset 102 includes at least one of auditory data 141, image data 143, numerical data (not shown), textual data 144, sensor data 146 or other types of data.

Further referencing FIG. 1B, method 150 includes operation 153 of pattern extraction performed with pattern extractor 120. Pattern extraction 153 includes at least extracting feature embeddings 103 from dataset 102. In some embodiments the feature embeddings 103 are encoded information extracted as feature embeddings 103 and represented as a vector. In some embodiments the pattern extractor 120 is a trained classifier. Once the classifier is trained, then during inference, the trained classifier extracts useful discriminating features from dataset 102 as the feature embeddings 103. In some embodiments, during inference the classifier operates without a final activation layer, such as a softmax activation layer. Instead, the classifier outputs from a prefinal dense layer. In some embodiments the pattern extractor 120 has an optimal inverted residual network architecture. Those skilled in the art will be familiar with this optimal inverted residual network architecture and it will not be further described.

Further referencing FIG. 1B, method 150 further includes operation 155 of data attenuation which is also performed with data attenuator 121. Data attenuation includes at least one of random feature selection or insertion of additive white Gaussian noise. The data attenuation regularizes training of neural networks and avoids overfitting while still allowing useful information to flow through a network. The result of data attenuation is attenuated input data 104 for feeding to the generator 124. Attenuated input data 104 is fed to a generator as a condition that controls the generator's output.

Feature selection may be intentional around certain dataset features (facial features or bounded areas in an image), or the feature selection may be random. Random feature selection includes at least randomly selecting some of feature embeddings 103 for input to the generator 124 and dropping, for example discarding, the remainder of the feature embeddings 103. Random feature selection is performed with random feature selector 122. In one embodiment, random feature selector 122 receives the feature embeddings 103 from pattern extractor 120, drops a percentage of the feature embeddings 103, and the remaining feature embeddings are then randomly selected for feeding to the generator 124. In some other embodiments, the random feature selector 122 randomly selects from all of the feature embeddings 103, without first dropping some of the feature embeddings 103. The percentage of the feature embeddings 103 that are dropped or discarded is referred to as a "drop rate." In some embodiments the drop rate is, for example, between 40% and 50%. That is, 40% to 50% of the data is discarded and the remainder are retained.

White noise injector 123 performs insertion of additive white Gaussian noise by inserting additive white Gaussian noise into the feature embeddings 103. White noise injector 123 individually mixes the feature embedding 103 with additive white Gaussian noise, for example white noise with a standard deviation $\sigma=2$ and with mean $\mu=0$.

Continuing with reference to FIG. 1B, the method 150 includes operation 157 of data attenuator 121 providing the attenuated data 104 to generator 124. The generator 124 then performs operation 159 of generating synthetic data 106. In some embodiments, the operations that follow depend on whether either of the generator 124 or the discriminator 125 are in training and on whether the generator 124 is in inference:

a. Generator is in Training: In some embodiments, if generator 124 is in training, then in operation 161 the generator 124 provides the synthetic data 106 to discriminator 125 which performs operation 162 of discriminating between synthetic data 106 and real data 139. The generator 124 learns by feedback from the discriminator 125, including whether the discriminator is able to successfully distinguish between the synthetic data 106 and real data 139 by assigning correct probabilities.

b. Generator in Inference and Discriminator not in Training: Alternatively, if generator 124 is in inference and the discriminator 125 is not in training, then GAN 110 (e.g. of FIG. 1A) performs operation 163 of outputting the synthetic data 106 as the output of the GAN 110. The output synthetic data 106 will have a statistical distribution 165 that is similar to but different from a distribution of real data 139. In operation 166, the synthetic data 106 is provided to a real world application that utilizes the synthetic data for a practical application. Possible real world applications include, for example, CAPTCHA generation, enriching an existing training dataset (for example, to address class imbalance problems, scarcity of data, or other issues), additional data for use with online/increment training models, or other uses. Some of these possible uses are discussed in more detail below.

c. Generator in Inference and Discriminator is in Training: Alternatively, if the discriminator 125 is in training, one or more computing devices perform operation 168 of data set augmentation. The one or more computing devices perform data set augmentation by combining the synthetic data 106 with real world data 139 to form an augmented dataset 107. In operation 170, the one or more computing devices provide the augmented dataset 107 to the discriminator 125. And in operation 172, the discriminator 125 trains with the augmented data set 107.

Figure 2A:
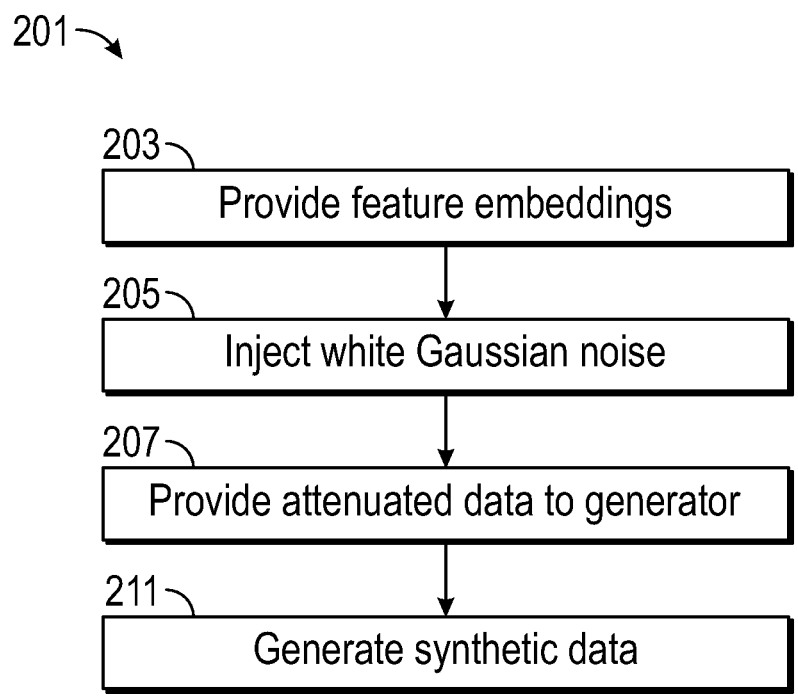
FIG. 2A is a method flow diagram illustrating an exemplary method for insertion of additive white Gaussian noise into feature embeddings consistent with some embodiments.
Figure 2B:
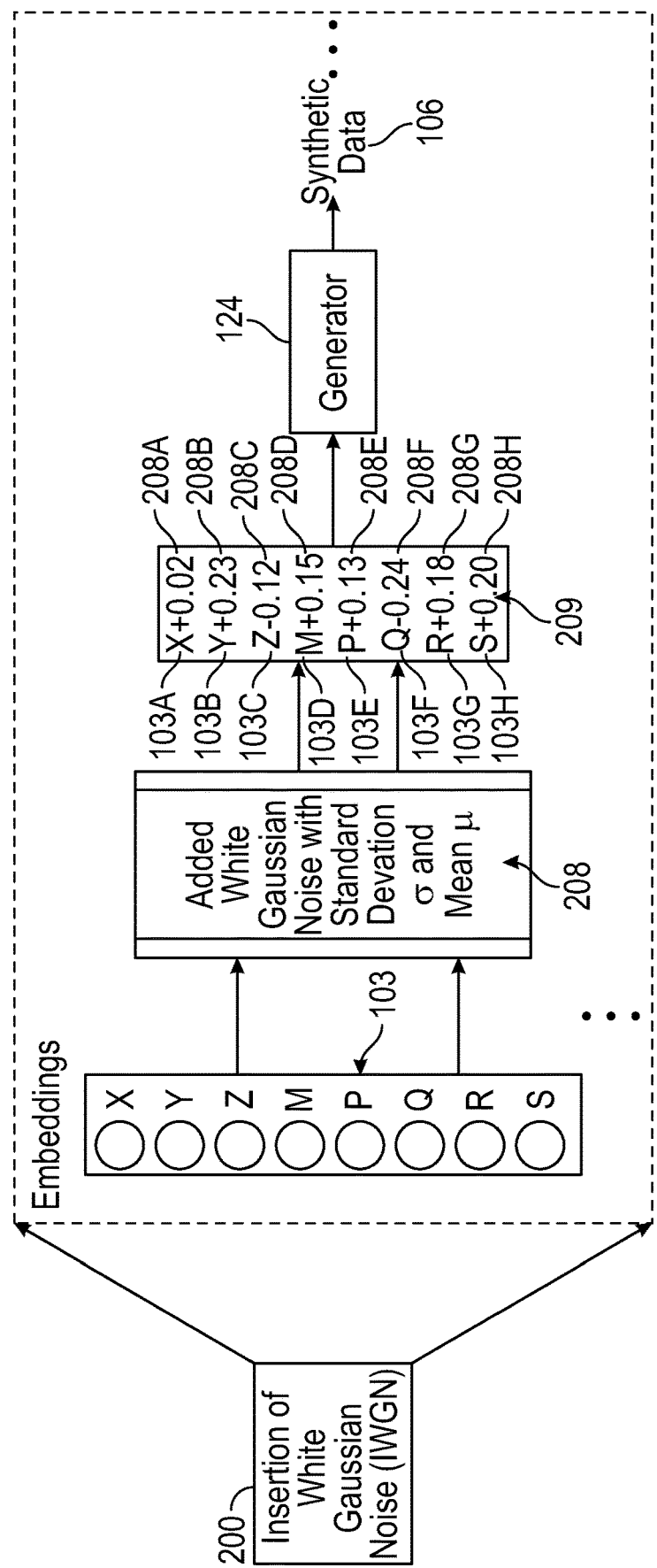
FIG. 2B is a schematic diagram illustrating a sequence of structures associated with the method of FIG. 2A, consistent with some embodiments.

Referencing FIGS. 2A and 2B, a method flow chart (FIG. 2A) illustrates method 201 of injecting additive white Gaussian noise into image feature embeddings and a sequence diagram (FIG. 2B) illustrates a sequence 200 of structures associated with method 201. Method 201 and sequence 200 are discussed in tandem. In operation 203 of FIG. 2A feature embeddings 103 are provided. For example, in some embodiments pattern extractor 120 performs operation 203. The feature embeddings 103 are illustrated as feature embeddings X, Y, Z, M, P, Q, R, S. In operation 205 additive white Gaussian noise 208 is added to the above feature embeddings 103. The additive white Gaussian noise 208 has a standard deviation $\sigma$ and a mean of $\mu$. In some embodiments $\sigma=2$ and $\mu=2$.

The specific feature embeddings 103, for example feature embeddings 103A-103H, are illustrated with specific elements of additive white Gaussian noise 208 added, for example elements 208A-208H. The indicated white noise elements 208A-208H are depicted as numerals representing standard deviations and can be added or subtracted to the data. The following white noise elements are added to the specific feature embeddings: X+0.02, Y+0.23, Z−0.12, M+0.15, P+0.13, Q−0.24, R+0.18, and S+0.20. The feature embeddings 103 are now reduced in contributed value by the superposition of additive white Gaussian noise 208 to become attenuated input data 209, that is, more specifically, feature embeddings that are attenuated by the injection of white Gaussian Noise. In operation 207 the attenuated data 209 is fed to the generator 124, which in operation 211 generates synthetic data 106.

Figure 3A:
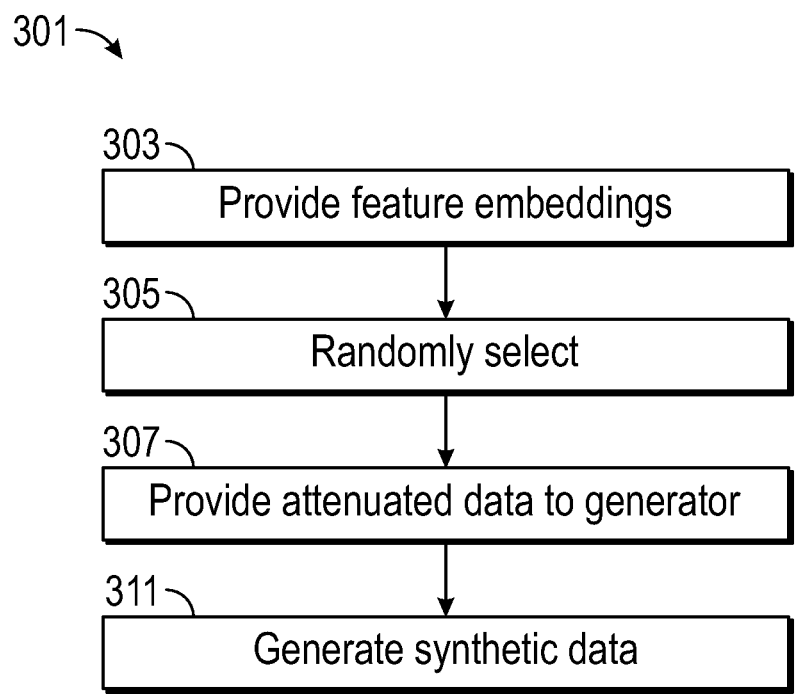
FIG. 3A is a method flow diagram illustrating an exemplary method for random feature selection from a set of feature embeddings, consistent with some embodiments.
Figure 3B:
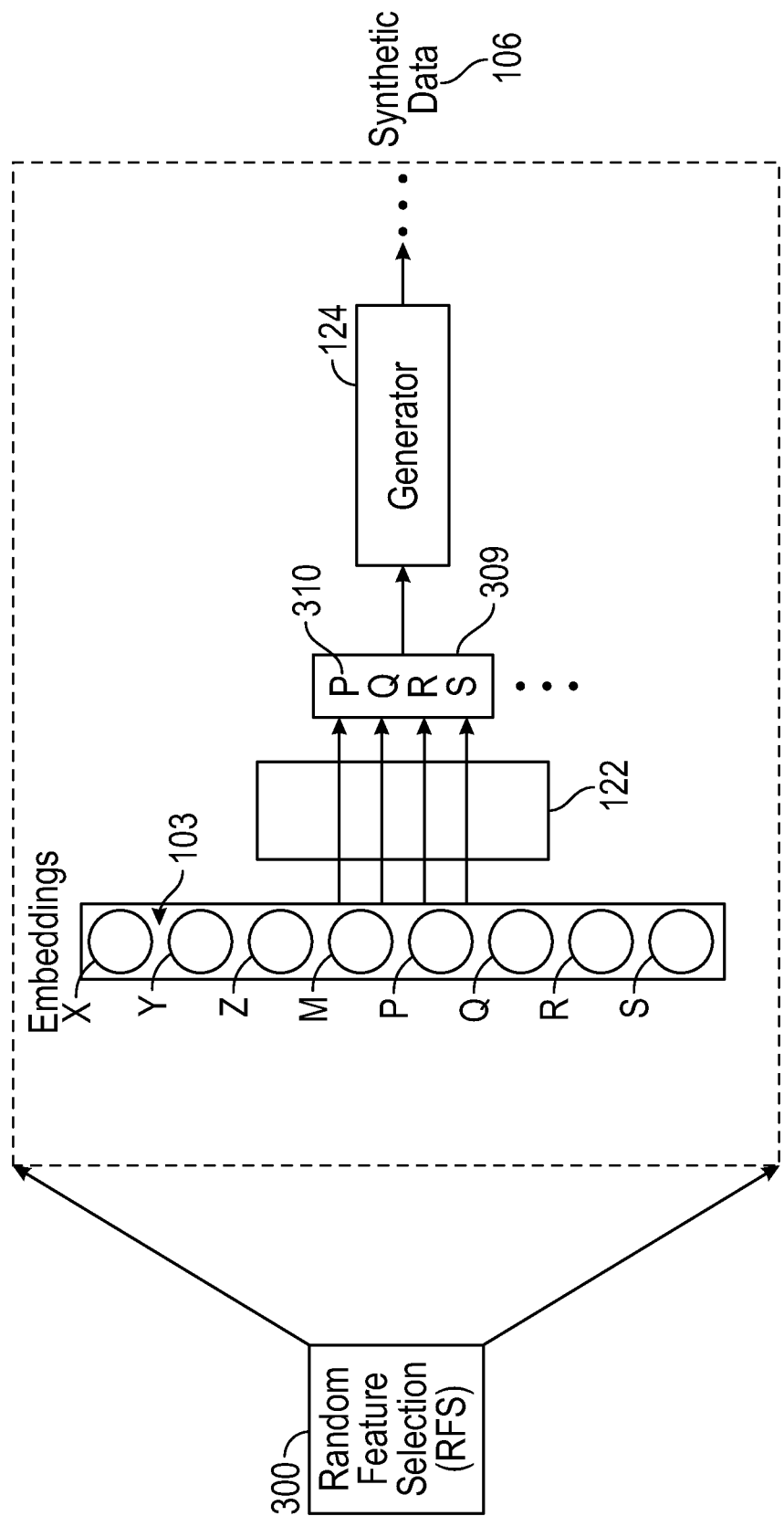
FIG. 3B is a schematic diagram illustrating a sequence of structures associated with the method of FIG. 3A, consistent with some embodiments.

Referencing FIGS. 3A and 3B, a method flow chart (FIG. 3A) illustrates method 301 for applying random feature selection to feature embeddings and a sequence diagram (FIG. 3B) illustrates a sequence 300 of structures associated with method 301. Method 301 and sequence 300 are discussed in tandem. In operation 303 example feature embeddings 103 are provided. For example, in some embodiments pattern extractor 120 performs operation 303. The feature embeddings 103 are illustrated as feature embeddings X, Y, Z, M, P, Q, R, S. In operation 305 random selection is performed by random feature selector 122 reducing the feature embeddings 103 to a subset of feature embeddings 310, namely embeddings P, Q, R, S. The subset of feature embeddings 310 is attenuated input data 309, that is, more specifically, feature embeddings that are attenuated by the random selection. In operation 307 the attenuated input data 309 is provided to the generator 124, which performs operation 311 of generating synthetic data 106.

Figure 4A:
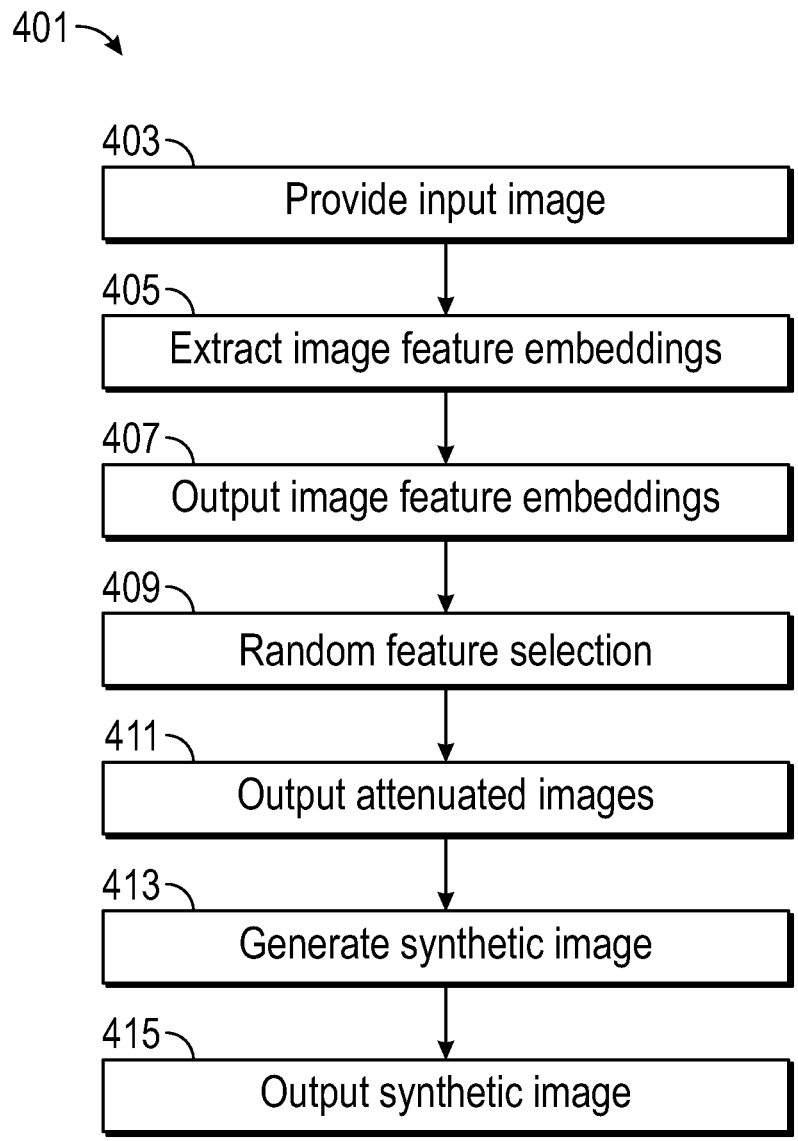
FIG. 4A is a flow diagram illustrating an exemplary method for generating a synthetic image based at least in part on random feature selection from image feature embeddings, consistent with some embodiments.
Figure 4B:
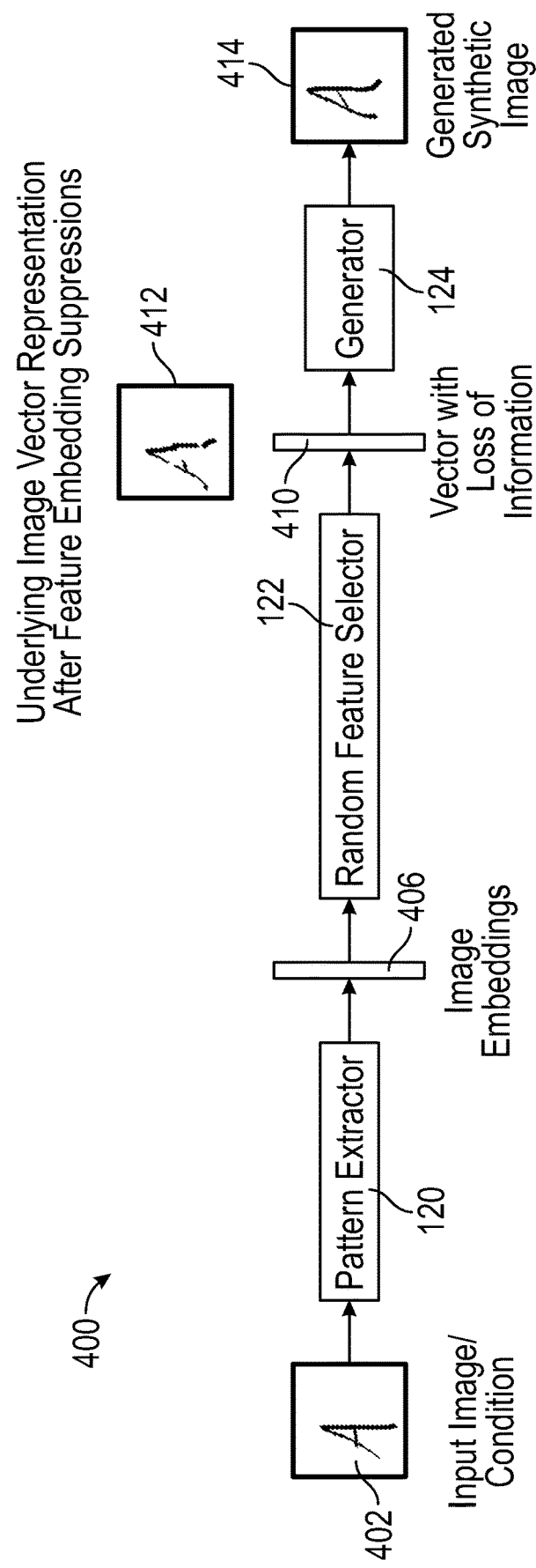
FIG. 4B is a sequence diagram illustrating a sequence of structures associated with the method of FIG. 4A.

Referencing FIGS. 4A and 4B, a method flow chart (FIG. 4A) illustrates method 401 for applying random feature selection to feature embeddings and a sequence diagram (FIG. 4B) illustrates a sequence 400 of structures associated with method 401. Method 401 and sequence 400 are discussed in tandem. In operation 403, an input image/condition 402 is provided, for example via communication interface 128. An initial input image 402 is depicted. In operation 405 a pattern extractor 120 extracts image feature embeddings 406 and in operation 407 outputs the image feature embeddings 406. The image feature embeddings 406 are feature embeddings 103 that are extracted from image data, such as input image/condition 402.

In operation 409, random feature selector 122 accepts image feature embeddings 406 as input and performs random feature selection, wherein a portion of the image feature embeddings 406 are selected for output. The random feature selector drops the unselected image feature embeddings. In operation 411 random feature selector outputs attenuated image data 410, represented as a vector with loss of information. Image 412 is a lossy image corresponding to the attenuated image data 410 showing the effects of data loss compared with input image/condition 402.

In operation 413 generator 124 accepts attenuated image data 410 as input and generates a synthetic image based at least in part on the attenuated image data 410. In operation 415 generator 124 outputs generated synthetic image 414. A comparison of generated synthetic image 414 and input image/condition 402 reveals that generated synthetic image 414 is different but similar in quality, that is for example, similar in precision. Thus, generator 124 compensates for the loss of information in the attenuated image data 410 and generates a synthetic image 414 of similar quality (e.g. similar precision) to input image/condition 402.

Figure 4C:
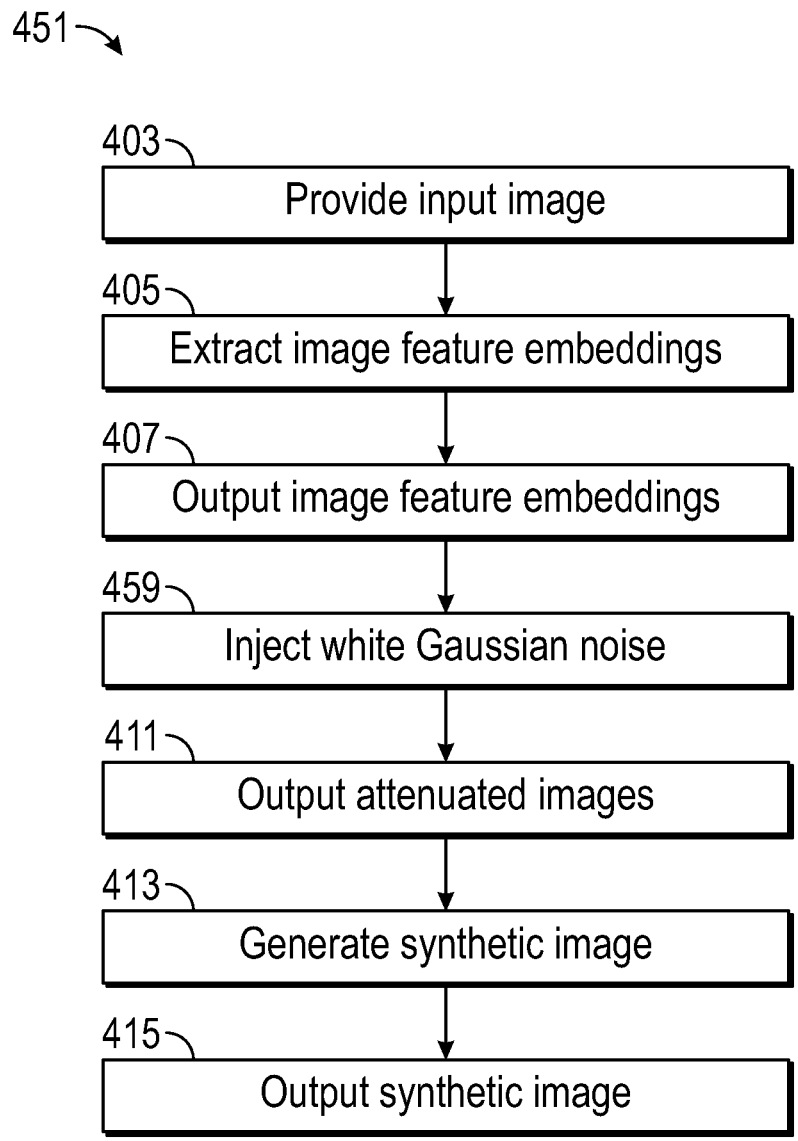
FIG. 4C is a flow diagram illustrating an exemplary method for generating a synthetic image based at least in part on addition of additive white Gaussian noise to image feature embeddings, consistent with some embodiments.
Figure 4D:
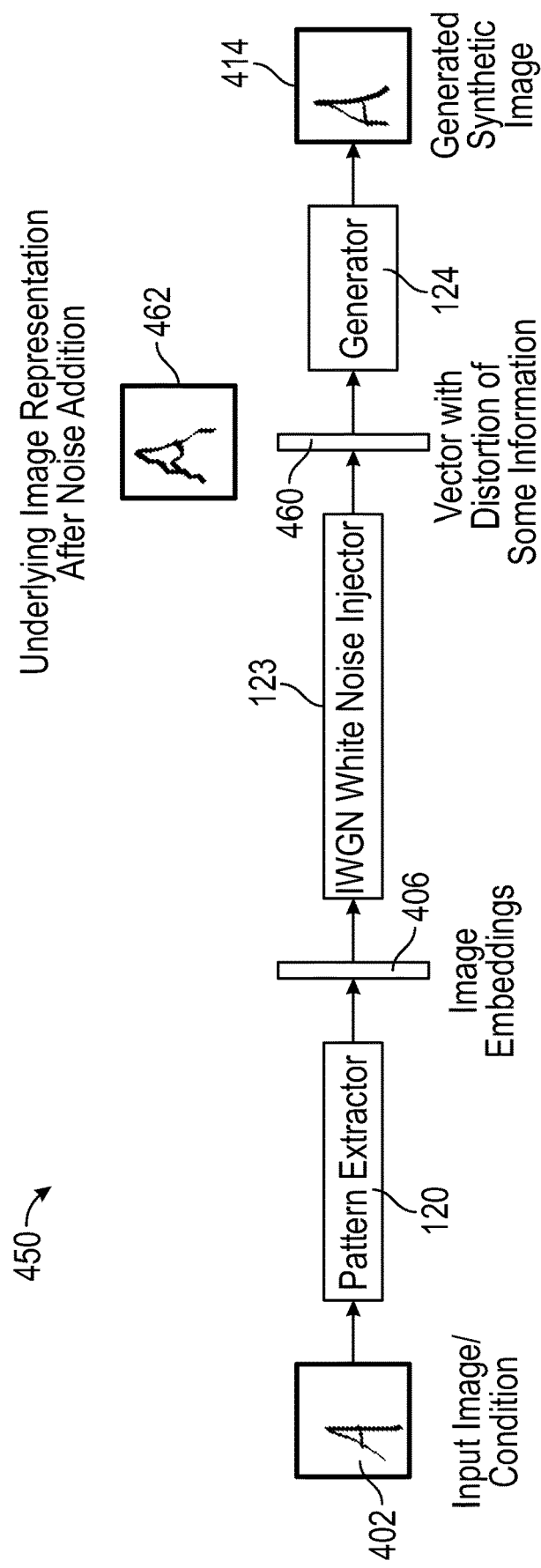
FIG. 4D is a sequence diagram illustrating a sequence of structures associated with the method of FIG. 4C.

Referencing FIGS. 4C and 4D, a method flow chart (FIG. 4C) illustrates method 451 of injecting additive white Gaussian noise into image feature embeddings 406 and a sequence diagram (FIG. 4D) illustrates a sequence 450 of structures associated with method 451. Method 451 and sequence 450 are discussed in tandem. In operation 403, an input image/condition 402 is provided, for example via communication interface or obtained by processing device 130 from dataset 102. An initial input image 402 is depicted. In operation 405 a pattern extractor 120 extracts image feature embeddings 406 and in operation 407 outputs the image feature embeddings 406. The image feature embeddings 406 are feature embeddings 103 that are extracted from image data, such as for example input image/condition 402.

In operation 459, white noise injector 123 accepts image feature embeddings 406 as input and injects additive white Gaussian noise into the image feature embeddings 406. In operation 411 white noise injector 123 outputs attenuated image data 460, represented as a vector with distortion of some information. Image 462 is an image corresponding to the attenuated image data 460 showing the effects of data distortion compared with input image/condition 402.

In operation 413 generator 124 accepts attenuated image data 460 as input and generates a synthetic image based at least in part on the attenuated image data 460. In operation 415 generator 124 outputs generated synthetic image 474. A comparison of generated synthetic image 474 and input image/condition 402 reveals that generated synthetic image 474 is different but similar in quality (e.g. similar in precision). Thus, generator 124 compensates for the distortion of information in the attenuated image data 460 and generates a generated synthetic image 474 of similar quality (e.g. similar in precision) to input image/condition 402.

Figure 5A:
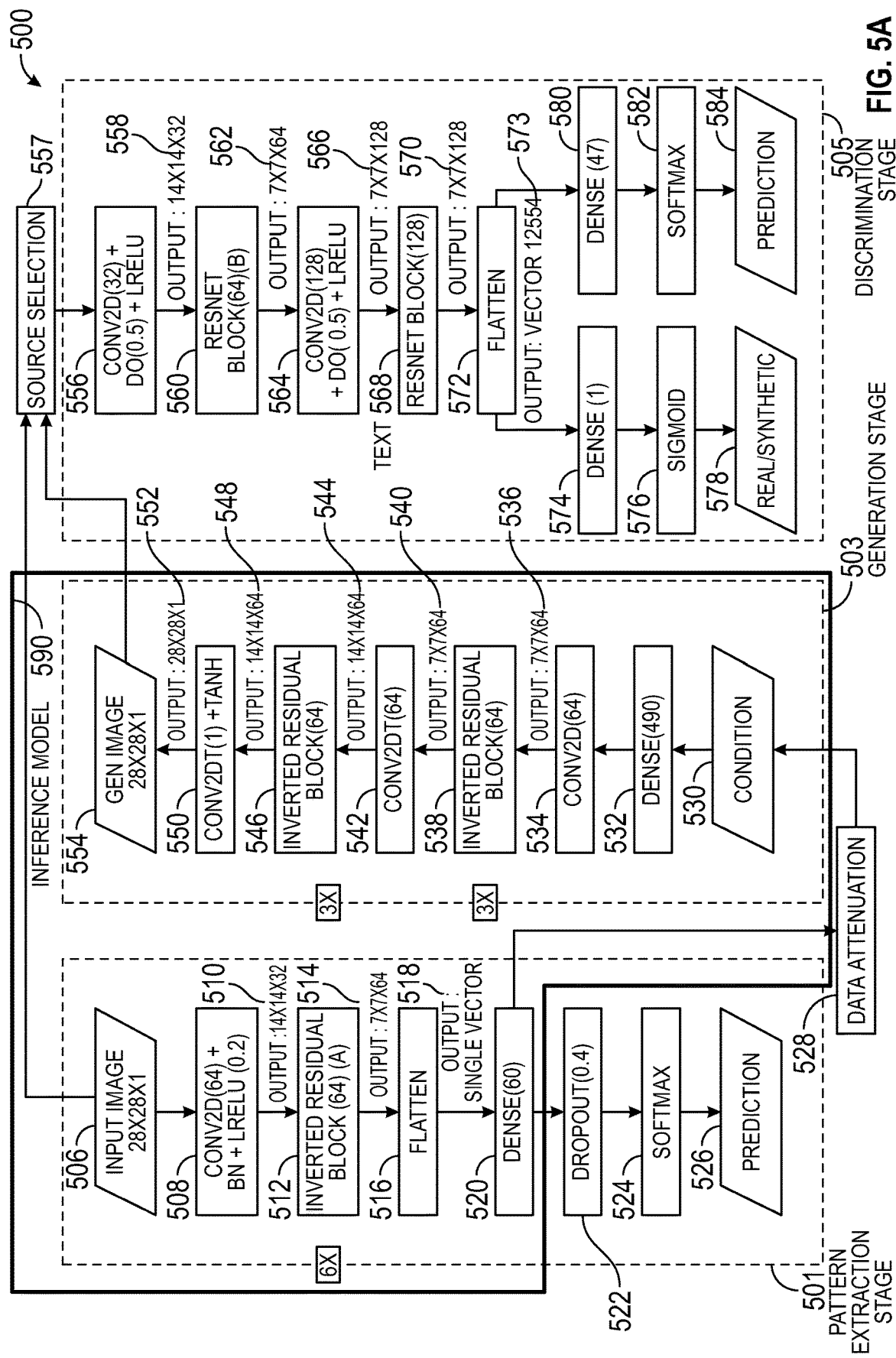
FIG. 5A is a flow diagram illustrating an exemplary method of operating a generative adversarial network, consistent with some embodiments.
Figure 5B:
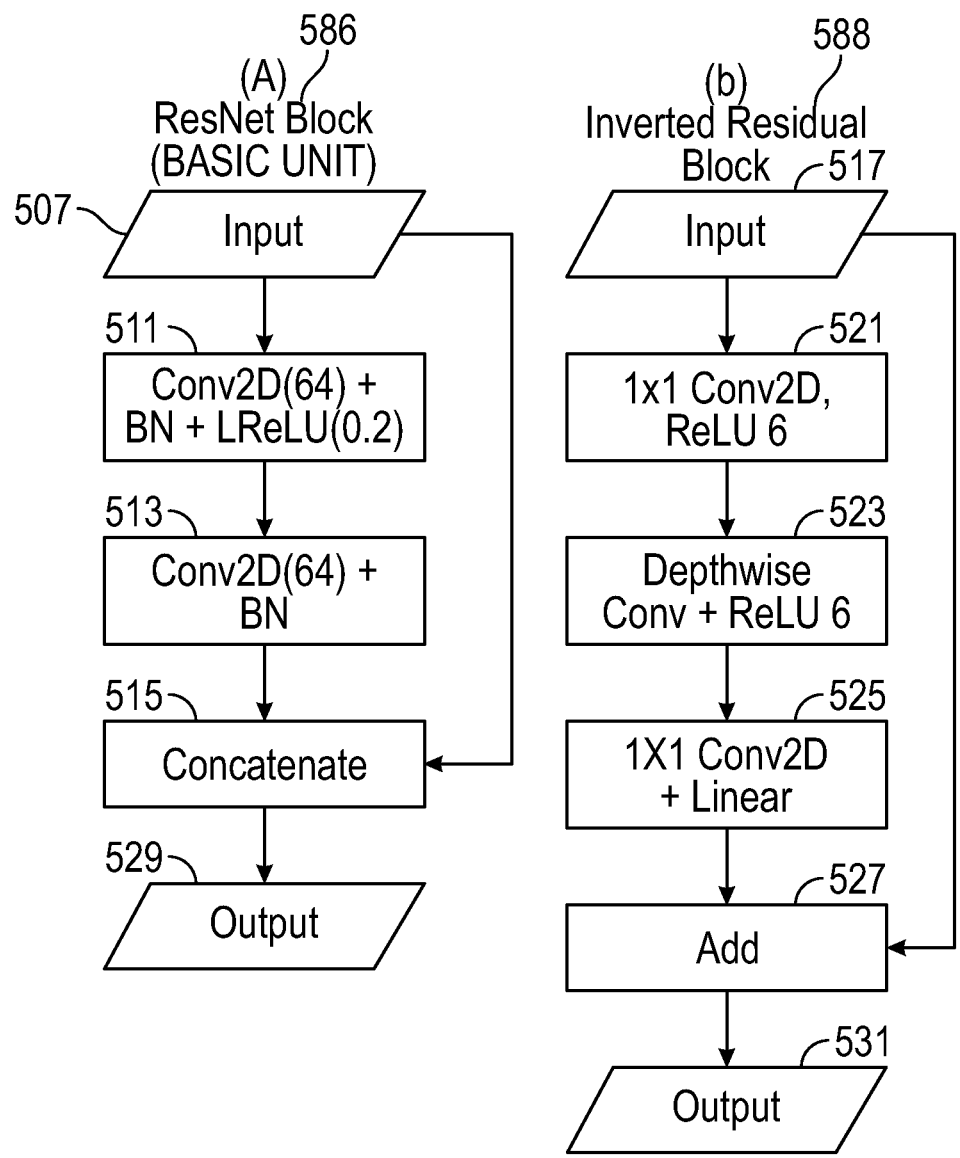
FIG. 5B includes two flow diagrams illustrating methods of executing a ResNet block and executing an inverted residual block.

Referencing FIGS. 5A and 5B, flow charts illustrate an exemplary methods consistent with some embodiments. Although FIGS. 5A and 5B shows illustrate methods with a low level of detail, many of the details illustrated are examples only. Those skilled in the art will appreciate ways to modify the illustrated methods consistent with the teachings herein. Also, the order of the various operations is in at least some cases, exemplary only.

In addition, for purposes of illustration, the data worked with in FIGS. 5A and 5B is image data. The operations as depicted are for image data. However, those skilled in the art will recognize that the operations depicted can be modified for auditory, sensor, or other types of data without undue experimentation.

At a high level, FIG. 5A illustrates operations of method 500 that are grouped in a pattern extraction stage 501 performed with a pattern extractor, a generation stage 503 performed with a generator, and a discrimination stage 505 performed with a discriminator. In addition, FIG. 5B illustrates a process 586 illustrates operations performed with a ResNet Block (Basic Unit) and a process 588 illustrates operations performed with an inverted residual block. Both of processes 586 and 588 are used in one or more of the operations in stages 501 with the pattern extractor, 503 with the generator, or 505 with the discriminator, as discussed below.

Further referencing FIG. 5A, as discussed above, the use of feature embeddings, whether attenuated via random feature selection of a subset of the feature embeddings or whether attenuated by adding additive white Gaussian noise to the feature embeddings, regularizes the training of a GAN, avoids overfitting, and promotes generation of useful variations of the synthetic images.

Figure 6A:
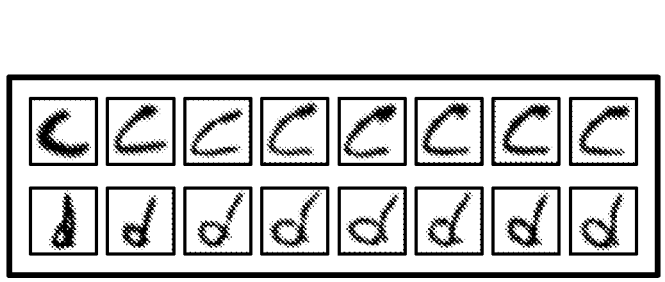
FIGS. 6A-6D depict images obtained from experiments performed with one or more embodiments.

In particular, with respect to random feature selection, dropping a randomly-selected subset of the feature embeddings suppresses information corresponding to some features present in an image. That is, information corresponding to some features in an image is suppressed by not retaining a randomly-selected subset of feature embeddings. But with proper training the generator learns to construct an image from the remaining information. The percentage of feature embeddings dropped via random feature selection (RFS) defines a drop rate. If a drop rate of feature embeddings is too low then the resultant variation in the generated samples is less, and if the drop rate of feature embeddings too high then it may result into a complete change in image class. For example, where the real data is images of alphabet letters, a drop rate that is too high may result in the generator generating synthetic images that are not images of alphabet letters. Results with various drop rates are discussed below relative to FIGS. 6A-6B.

FIG. 5A presents operations by a discriminator using a particular classifier, a softmax classifier, to map an input image to softmax embedding space wherein values of a final layer for each input represent the coordinate of that input in multi-dimensional embedding space. A goal is that an output image sample with changed coordinates remains in same class as the input image sample for the input condition. But, nonetheless, the output sample should have sufficient distinguishable variation. The degree of variation is controlled by the drop rate when using random feature selection or by the amount of additive white Gaussian noise injected directly into the feature embeddings.

The discriminator is important for training the generator for generation of realistic synthetic data, such as images. The feature embeddings acts as a well-defined condition for data generation and the generator learns to generate realistic synthetic images with the adversarial training through a discriminator which penalizes the generator for both (1) an image that appears to be artificially synthesized as well as (2) an image which looks of different class than the pattern of images provided. Hence two objectives are accomplished.

In some embodiments the discriminator has two-loss functions with two parts: 1) the log-likelihood of the correct source, and 2) the log-likelihood of the correct class. The discriminator derives both a probability distribution over sources and a probability distribution over the class labels and is trained to maximize both probabilities.

Further referencing FIG. 5A, the pattern extraction stage 501 extracts the features of an input image to form the feature embeddings. Although the pattern extraction stage 501 proceeds from operations 506, 508, 510, 512, 514, 516, 518, 520, 522, 524, and 526, as most relevant here, after operation 520 in which the feature embeddings are processed with a dense layer of the pattern extractor, the feature embeddings are fed to operation 528 for data attenuation, which includes either random feature selection or injection with additive white Gaussian noise. Thereafter, the attenuated data passes to the generation stage 503, with operation 530 with the attenuated data acting as a condition to the generation stage 503.

Diagram 500 shows inverted residual blocks in the generation stage 503. The basic operations for the inverted residual blocks are shown via process 588. As indicated process 588 includes a depthwise separable convolution In operation 523. Usage of the inverted residual blocks with the depthwise separable convolution helps reduce the size of the trained model and also helps accelerate convergence of the training process. Method 500 also residual blocks in the discrimination stage 505. The basic operations for the residual blocks are shown via process 586.

Before stepping through the specific operations of FIGS. 5A and 5B, some of the terminology used is now discussed. Each of the functions described below is well known to those skilled in the art, and may be found, for example, in various programming libraries, such as for python programming language (www.python.org) in the pytorch module documentation (pytorch.org/docs/stable/nn.html), or in open source computer vision project OpenCV (https://docs.opencv.org/4.5.4/modules.html), or in the tensorflow project programming libraries (https://www.tensorflow.org/resources/libraries-extensions). For clarity in understanding the invention, the functional behavior of the various programming modules is described below:

a. BN refers to batch normalization which standardizes or normalizes inputs. BN is used to stabilize the learning process and to reduce the number of training epochs required in deep neural networks. An epoch refers to the passage of an entire dataset through the neural network once, whereas an epoch may comprise multiple subsets of the dataset passed through the neural network in smaller batches.

b. conv2D includes to a two-dimensional convolution. This terminology is used as understood by those of skill in the art. But briefly, in machine language a two-dimensional convolution rerefers to a convolution performed on a file. The convolution is performed on, for example, an image using a filter or kernel having two dimensions, typically a height and a width. Stride for Conv2D layers is 1.

c. conv2DT includes a transpose of a two-dimensional convolution. This terminology is used as understood by those of skill in the art. The need for transposed convolutions generally arises from a desire to use a transformation going in the opposite direction of a normal convolution. For example, mapping from data, for example an image, that has the shape of an output of some convolution to data that has the shape of its input while maintaining a connectivity pattern that is compatible with said convolution. Stride for Conv2DT layers is 2.

d. Dense layers include fully connected layers. A dense layer is a common deeply connected neural network layer. A dense layer does the below operation on the input and returns the output: Output=activation(dot (input, kernel)+bias).

e. Dropout layer includes a layer that randomly sets input units to 0 with a frequency of rate at each step during training time, which helps prevent overfitting. A parameter, such as 0.5 which is commonly used, sets the frequency rate, which is a probability of a given input unit being set to zero, f. Flattening includes converting the data, such as a matrix, into a 1-dimensional array for inputting it to the next layer. Some embodiments flatten the output of the convolutional layers to create a single long feature vector.

g. Inverted residual block includes a residual block (see below) with an inverted shape of narrow→wide→narrow. In some embodiments, residual blocks described herein are customized n terms of a number of layers in the neural net and a number of filters in each layer based on requirements for some embodiments.

h. ReLU 6 refers to a Rectified Linear Activation Function with the activation limited to 6.

i. LReLU refers to a Leaky Rectified Linear Activation Function.

j. Residual block includes a block of code in which an input to the block is added to an output of the block. Residual blocks often have a shape of wide→narrow→wide.

k. Sigmoid activation function is, for example, sigmoid $(x)=1/(1+\exp(-x))$. For small values ($<-5$), a sigmoid activation function returns a value that approaches zero. And for large values ($>5$) the result of the sigmoid activation function approaches 1.

l. Softmax classifier layer is a layer that is often used as the activation for the last layer of a classification network because the result may be interpreted as a probability distribution.

m. Tan h activation function includes a well-known hyperbolic tangent activation function that has similarities to the Sigmoid activation function, discussed above.

n. Terms such as 3×, 6×, etc. indicate a number of repetitions of a procedure.

In the embodiments of FIG. 5A, the generation stage 503 and the discrimination stage 505 include the following operations, which are briefly described:

a. Generation stage 503: The example generation stage 503 includes an acceptance of the attenuated data as a condition (operation 530), a dense layer with 490 connections (operation 532), a conv2D with 64 filter kernels (operation 534), an inverted residual block with 64 filters (operation 538), a conv2DT with 64 filters (block 542), another inverted residual block with 64 filters (block 546), a block with both a conv2DT with a single filter and a Tan h function (operation 550), and an image generation (operation 554).

b. Discrimination stage 505: The example discrimination stage 505 includes an operation (operation 556) with a first conv2D with 32 filter kernels, a dropout layer with a frequency rate of 0.5 and LReLU activation function followed by a residual layer with 64 kernels (operation 560), another operation with a con2D with 128 filter kernels, another dropout layer with a frequency rate of 0.5, and an LReLU activation function (operation 564). Next is another residual layer with 128 kernels (operation 568), and a flattening operation (operation 572). After the above, a first branch of operations ends with a sigmoid activation function (operation 576) to discriminate between real and synthetic images. A second branch of operations ends with a softmax layer (operation 582) to produce a predicted class label.

Turning first to operations associated with the pattern extraction stage 501, method 500 includes an operation 506 of providing an input image. In some embodiments, the image is a 28×28×1 image, where the first 28 is a height in pixels, the second 28 is a width in pixels, and the 1 is the number of channels. In instances where there are three channels, they could be, for example a red channel, a green channel, and a blue channel. In some embodiments an image is additionally or alternatively provided to operation 557 of source selection, discussed below relative to discrimination stage 505.

Returning to the pattern extraction stage of the method 500, a pattern extractor, such as for example pattern extractor 120 of FIG. 1, performs operation 508 designated as "Conv2D(64)+BN+LReLU(0.2)." These are actually a combination of three procedures. First "Conv2D(64)" is a two-dimensional convolution using 64 filters. BN is batch normalization. And "LReLU(0.2)" is the Leaky Rectified Linear Activation function with 0.2 being a value for a constant multiplier. The pattern extractor then performs operation 510 outputting a 14×14×32 image.

In operation 512, the pattern extractor utilizes an "inverted residual block (64)(a)" on the 14×14×32 image of operation 510. As indicated by the 6× of FIG. 5A, operation 512 is performed six times. The pattern extractor then performs operation 514 outputting a 7×7×64 image.

In operation 516, the pattern extractor performs a "flatten" operation on data representing the 7×7×64 image of operation 514 to flatten this data to a single vector. Pattern extractor then performs operation 518 outputting a single vector that represents the data of the previous 7×7×64 image.

In operation 520, pattern extractor accepts as input the single vector of operation 518 and processes the single vector with a dense layer, outputting the image feature embeddings, such as the image feature embeddings of FIGS. 4A and 4B.

As previously discussed, pattern extractor is a classifier when in training. As a classifier in training, the classifier would perform operations 522, 524, and 526. Briefly, these operations are operation 522 of "dropout (0.4)" which is a dropout layer with a parameter of 0.4, operation 524 utilizing a softmax layer, and operation 526 of making a prediction of a classification for image data. These optional operations are performed when the classifier is training.

When the classifier is in inference being used as a pattern extractor, the flow of operations leaves the pattern extraction stage 501 after operation 520 and goes to operation 528, data attenuation. The output of operation 528 is attenuated data, such as attenuated image data 410 and 460 of FIGS. 4A and 4B, respectively. The attenuated image data is a "condition" for controlling the generator 503.

And in operation 532, a generator, such as for example generator 124 of FIG. 1, accepts this condition. In operation 534 generator uses the condition as input to "dense (490)", a dense layer with 490 connections.

In operation 534 the generator accepts the output of the dense layer as input to "Conv2D(64)", a two-dimensional convolution using 64 filters. The generator then in operation 536 outputs a 7×7×64 image as output from the two-dimensional convolution.

In operation 538, the generator uses the 7×7×64 image as input to "Inverted residual block (64)," an inverted residual block using 64 filters. Operation 538 is performed three times as indicated by the "3×" in FIG. 5A. The generator then in operation 540 outputs the result of the inverted residual block operations as a 7×7×64 image.

In operation 542, the generator uses the 7×7×64 image as input to "Conv2DT(64) a two-dimensional transposed convolution using 64 filters. The generator then in operation 544 outputs a 14×14×64 image as the output of the two-dimensional transposed convolution.

In operation 546, the generator uses the 14×14×64 image as input to "Inverted residual block (64)," an inverted residual block with 64 filters. Operation 546 is performed three times as indicated by the "3×" in FIG. 5A. The generator then in operation 548 outputs the result of the inverted residual block operations as a 14×14×64 image.

In operation 550, the generator 503 uses the 14×14×64 image as input to "Conv2DT(1)+Tan h" a two-dimensional transposed convolution using 1 filter following by an Tan h activation function. The generator then in operation 552 outputs a 28×28×1 image as the output of operation 550.

In operation 554, the generator 503 outputs the 28×28×1 image as a synthetic image to a discriminator. The 28×28×1 image is the same size as the input image and is similar but different from the input image. The operations in the generation stage 503 have taken the condition of operation 530 and gradually increased it in size and detail until it is the 28×28×1 synthetic image.

In operation 557, a source selection switch (not shown) receives both the input (real) image from operation 506 of pattern extraction stage 501 and the synthetic image from operation 554 of the generation stage 503, performs a selection operation, and then forwards either the input (real) image or the synthetic image as input to operation 556 discussed below. Thus, either the input (real) image or the synthetic image is selected for forwarding to the discrimination stage. In some embodiments, the selection is made randomly.

After operation 557 the flow of the method 500 advances to the discriminator, such as for example discriminator 125 of FIG. 1, which receives either the input (real) image or the synthetic image from operation 557. The discriminator 505 also receives the input image from pattern extractor or other circuitry. Therefore, the discriminator operation that follow can either be performed on a "real image" such as the input image received from the pattern extractor or the synthetic image from the generator 503. The discriminator operations below are the same regardless of whether the discriminator is processing a real image or a synthetic image.

The discriminator performs operation 556 of "conv2D (32)+Do(0.5)+LReLU" which includes a two-dimensional convolution with 32 filters, a Dropout layer with a frequency rate parameter of 0.5, and a Leaky Rectified Linear Activation function, LReLU. The discriminator then outputs a 14×14×32 image in operation 558 as output of operation 556.

In operation 560 the discriminator executes "ResNet Block (64)(A)" which includes the residual block of process 586, described below. In operation 562 the discriminator outputs a 7×7×64 image as the output of operation 560.

In operation 564 the discriminator performs "Conv2d (128)+Do(0.5)+LReLU" which includes a two-dimensional convolution with 128 filters, a Dropout layer with a frequency rate parameter of 0.5, and a Leaky Rectified Linear Activation function. The discriminator then outputs a 7×7×128 image in operation 566 as the output of operation 564.

In operation 568 the discriminator performs "ResNet Block (128)" which the residual block of process 586, described below. In operation 570 the discriminator outputs a 7×7×128 image as the output of operation 568.

In operation 572 the discriminator performs a flatten operation to convert the data representing the 7×7×128 image into a single vector. In operation 573 the discriminator outputs a single vector as the output of operation 572.

The flow of method 500 now proceeds to either operation 574 (for sigmoid function two-class discrimination) or to operation 580 (for softmax function multi-class discrimination). In this discussion we first address operation 574 and the operations that follow operation 574. And then we later return to discuss operation 580 and the operations that follow operation 580.

In operation 574 the discriminator utilizes a dense layer. In operation 576 the discriminator executes an Sigmoid activation function. And in operation 578 the discriminator outputs a probability indicative of whether the image it has been processing is artificially generated, that is a synthetic image from the generator 503 or whether it is real, that is a real image such as the input image from the pattern extractor.

We now turn out discussion to operation 580. In operation 580 the discriminator performs "dense(47)" which includes utilizing a dense layer with 47 connections on the single vector output in operation 573. In operation 582 the discriminator executes "Softmax" referring to a softmax activation function used for converting numerical values to statistical probabilities. And in operation 584 the generator issues a prediction about one or more labels it finds applicable to the processed image data.

Continuing with reference to FIG. 5B, method flow 586 for executing a residual block, that is the ResNet Block (basic unit), is now described. In method 500, the residual block is executed only be the discriminator. In operation 507, the discriminator 505 accepts input for the residual block, which for the embodiment under discussion is image data. The image data could be for example, the either the 14×14×32 image output in operation 558 or the 7×7×128 image output in operation 566.

In operation 511 the discriminator processes the input by executing "Conv2D(64)+BN+LReLU(0.2)" which includes a two-dimensional convolution with 64 filters, a batch normalization, and a Leaky Rectified Linear Activation function. In operation 513 the discriminator then performs "Conv2D(64)+BN" which includes a two-dimensional convolution with 64 filters and a batch normalization.

In operation 515 discriminator takes the input received in operation 507 and concatenates it with output of operation 513. The discriminator output this concatenation in operation 529 as the output of the residual block.

Continuing with reference to FIG. 5B, method flow 588 for executing an inverted residual block is now described. In method 500, the inverted residual block is executed by both the pattern extractor and the generator. By using an inverted residual block a trained model size is reduced, which may allow porting of the trained model to a resource-constrained edge device. In operation 517, the pattern extractor 501 of the generator 503 accepts input for the inverted residual block, which in the embodiment under discussion is image data. The image data could be for example, the either the 14×14×32 image output in operation 558 or the 7×7×128 image output in the operation 566.

In operation 521, a pattern extractor or a generator executes "1×1 Conv2D, ReLU 6" which includes performing a 1×1 two-dimensional convolution on the input followed by using a Rectified Linear Activation function, ReLU with the activation limited to 6.

In operation 523 pattern extractor 501 or generator 503 executes "Depthwise Conv+ReLU 6" which includes a depthwise separable convolution and a call of a LReLU with the activation limited to 6.

In operation 525, the pattern extractor or the generator executes "1×1 Conv2D+Linear" which includes a 1×1 two-dimensional convolution and a linear output to operation 527. In operation 527 the pattern extractor or the generator concatenates the linear output from operation 525 with the input received in operation 517. And in operation 531 the pattern extractor or the generator outputs the concatenation resulting from operation 527 as the output of the inverted residual block.

Further referencing FIG. 5A, the method 500 has been described as performed with a pattern extractor, a generator, and a discriminator. The pattern extractor is used in its inference mode. Either the generator or the discriminator may be in training mode. Generally, the generator 503 and the discriminator 505 are not trained at the same time. During training, whether of the generator 503 or the discriminator 505, the generator 503 is providing synthetic data 106 to the discriminator 505. If the generator 503 is training, then the generator 503 is being trained via feedback from the discriminator 505. If the discriminator 505 is being trained, the synthetic data 106 is added to the dataset used to train the discriminator 505.

However, after the generator is sufficiently trained, the generator is placed in inference. In inference mode, the synthetic data 106 is used for some purpose (such as for example, as described later in this document), and the discriminator 505 is not needed. With the generator 503 in inference, only the operations bounded by the line defining the inference model 590 are used. In some embodiments, this inference model 590 requires a model size of less than 4 MB. In some embodiments, the model size is 3.2 MB.

Our discussion now shifts to discussion of some trials that were performed, some actual results, and some observations based on those actual results. For the testing and for the results discussed relative to FIGS. 6A-8 below, a pattern extractor of a GAN was trained using an adaptive learning rate optimization algorithm, herein after "Adam optimizer." The Adam optimizer was executed with beta 1=0.5 optimizer, with learning rate=5e-4, and with batch size of 128. 15 epochs were run on a training dataset consisting of 713 thousand samples of 535 MB. These hyperparameters were found to give a best annotation rate on validation set and early stopping.

Training for a complete GAN model was performed with an Adam optimizer with beta 1=0.4 for both the discriminator and the generator, with learning rate=2e-4 and with a batch size of 128. Training for 85 epochs was found to be most optimal after which there was no further improvement.

The generator began generating plausible images after the first 3 epochs. Further epochs were required for clearer and sharper output. It was found that for optimal training of the generator, the generator should get useful gradients throughout the training. That is, it is preferable for the discriminator not to become too proficient at making distinctions between synthetic and real data too soon. Otherwise, with same learning rate and same update steps for both generator and discriminator, the generator would stop making progress after several epochs.

Inventors developed some useful training heuristics for training pattern induced type of generators. While keeping the learning rate constant for some initial 20 epochs of training for whole GAN framework, the inventors updated the generator parameters 2×, 3× for each update step of the discriminator. The chosen schedule was 2× for first 20 epochs, 3× for next 10 epochs and later 1× for rest of the training. Inventors found this heuristic useful in stabilizing the GAN training without any requirement of spectral normalization of discriminator or generator weights. It is noted from the results that there is no mode collapse, thereby avoiding Mini-batch and projection discriminator as well. The training stability further helped avoid the usage of Wasserstein GAN (WGAN) objective function as well. Overall the above training procedures proved to provide stable training of GAN Models.

A system embodiment used in the above testing was coded using Python along with Tensorflow library and OpenCV 3.4.3. The system embodiment used a system configuration with Intel Xeon E5-2698 v4 2.2 GHz (20 core), 256 GB LRDIMM DDR4 primary memory with Ubuntu 16.04 server. Four NVIDIA 4×Tesla V100 GPU's containing 64 GB total GPU memory, executing at 480 TFLOPS (GPU FP16) on 20,480 NVIDIA CUDA cores.

Turning first to test results, FIGS. 6A-6D, show synthetically generated images following random feature selection at various drop rates from 10% to 50%. The drop rate indicates the percentage of feature embeddings that are discarded in random feature selection. For example, at a 10% drop rate, 90 percent of the feature embeddings are selected during random feature selection. The remaining 10% non-selected feature embeddings are discarded.

Figure 6B:
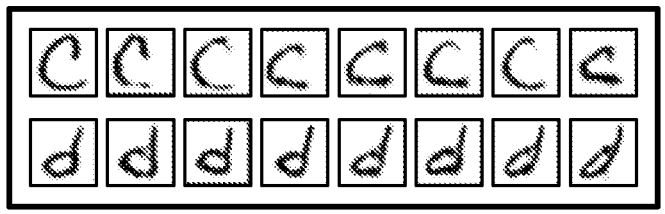
Figure 6C:
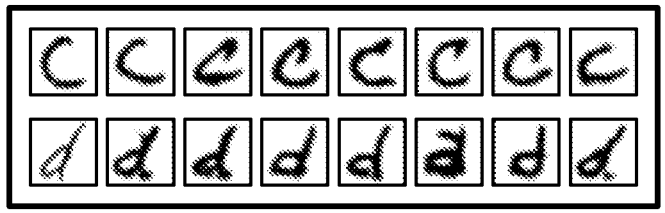
Figure 6D:
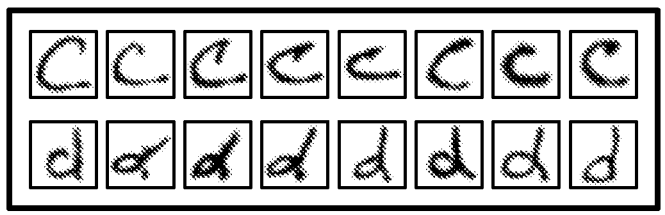

In FIGS. 6A-6D, FIG. 6A shows results in chart 600A with a 10 percent drop rate. FIG. 6B shows results in chart 600B with a 25 percent drop rate. FIG. 6C shows results in chart 600C with a 40 percent drop rate. And FIG. 6D shows results in chart 600D with a 50% drop rate.

Each of FIGS. 6A-6D includes two rows of letters, a row with c's" and a row with d's. The left most images in each row, that is the left-most c and d of each of FIGS. 6A-6D, are the original input for comparison with the rest of the images which are synthetic images generated by a generator. A complete change of class occurs when the c's no longer look like c's or the d's no longer look like d's. As can be observed, there is a risk of a complete change of image class if the drop percentage were to exceed 50 percent. Yet, variation in the synthetic images is desirable. And if the drop rate is too low, for example at 10%, there is less variation in the synthetic images. Therefore, in some embodiments, a preferred drop rate would be within a range of 40 and 50 percent.

Figure 7A:
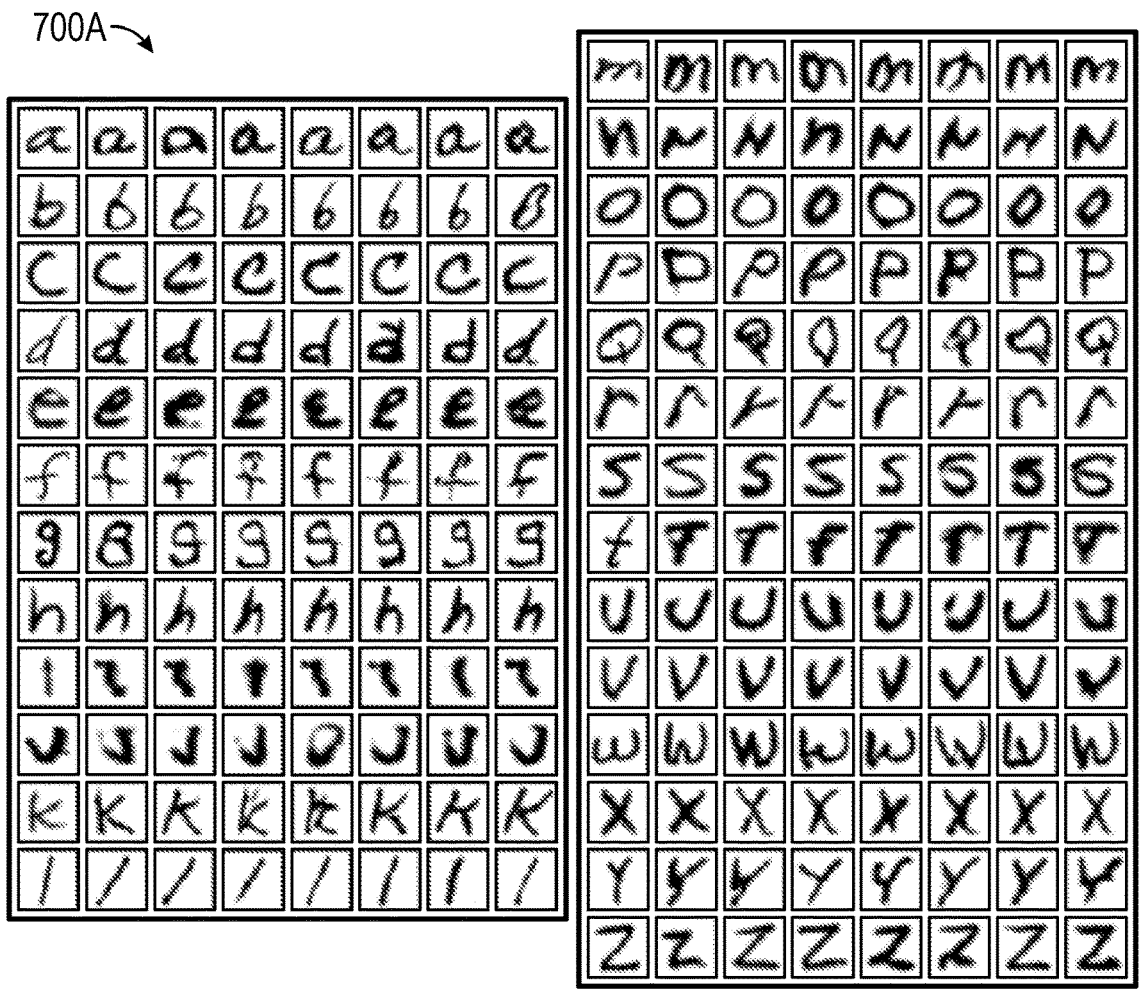
FIGS. 7A and 7B depict output images obtained from experiments performed with one or more embodiments.

FIG. 7A shows a chart 700A with both real and synthetically generated images of letters of the alphabet from a-z. Chart 700A includes both columns and rows with a row for each letter of the alphabet. The leftmost characters in the first column of each row are all original images, that is real images. The rest of the columns contain synthetic images that were generated by a generator using image feature embeddings that were reduced with random feature selection. The original images are from the eMNIST dataset. A comparison of the original images in the first column with the synthetic images in the other columns shows realistic variation in the generated synthetic images.

Figure 7B:
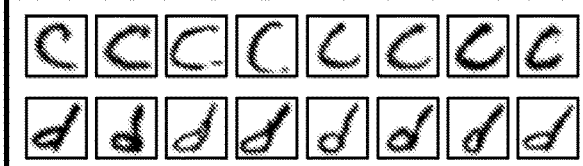

FIG. 7B shows a chart 700B with both real and synthetically generated images of the letters of the alphabet G and h, with one row for G's and one row for h's. The leftmost letters in each row are real images, the others are synthetically generated using random feature selection. The variation in the synthetically generated images can be observed.

Figure 8:
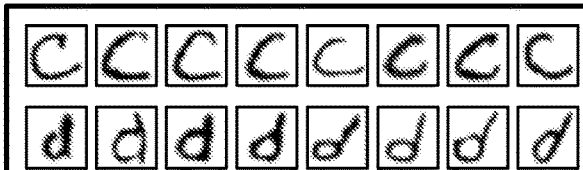
FIG. 8 depicts images obtained from experiments performed with one or more embodiments.

FIG. 8 shows chart 800 with synthetically generated images of letters of the alphabet with letters C, d in part A and with letters C, d in part B. Parts A and B each have a row of C's and a row of d's. In chart 800 the leftmost characters in the first column of each row are all original images, that is real images. The rest of the columns contain synthetic images that were generated by a generator using image feature embeddings that were injected with additive white Gaussian noise. The real images in the first columns on the left were seed images used to generate the synthetic images. Parts A and B show results from two consecutive test runs, with Part A having been run first. The original images are from the eMNIST dataset. A comparison of the original images in the first column with the synthetic images in the other columns shows realistic variation in the generated synthetic images.

Referencing FIGS. 9, shown is a Table 900 summarizing results of the testing. This testing was performed with an off-the-shelf classifier trained with one of two types of data: 1) an original data set containing only original images; or 2) an augmented data set containing both original images and augmented data (e.g. augmented with data produced with a trained GAN model, such as discussed above). The augmented data set included augmented data produced either via random feature selection (RFS) or via injection of white Gaussian noise (IWGN). The augmented data was approximately five times as great as the original data so the augmented data set was approximately six times as great as the original data set. In FIG. 9, the testing is summarized with four columns of data. The first two leftmost columns contain data on testing of the classifier trained with original images. Of these first two leftmost columns, the first column on the left contains data on the total number of images on which tests were run. The second column from the left contains the test set accuracy for the classifier trained on original images.

The third column from the left contains test set accuracy data for the classifier trained with a combination of original images plus data produced via random feature selection. The fourth column from the left contains test set accuracy data for the classifier trained with original images plus data produced via injection of white Gaussian noise. In each case, measured test set accuracy refers to measured inference accuracy. It is noted that the accuracy is greater in columns three and four than for column two.

Figure 10:
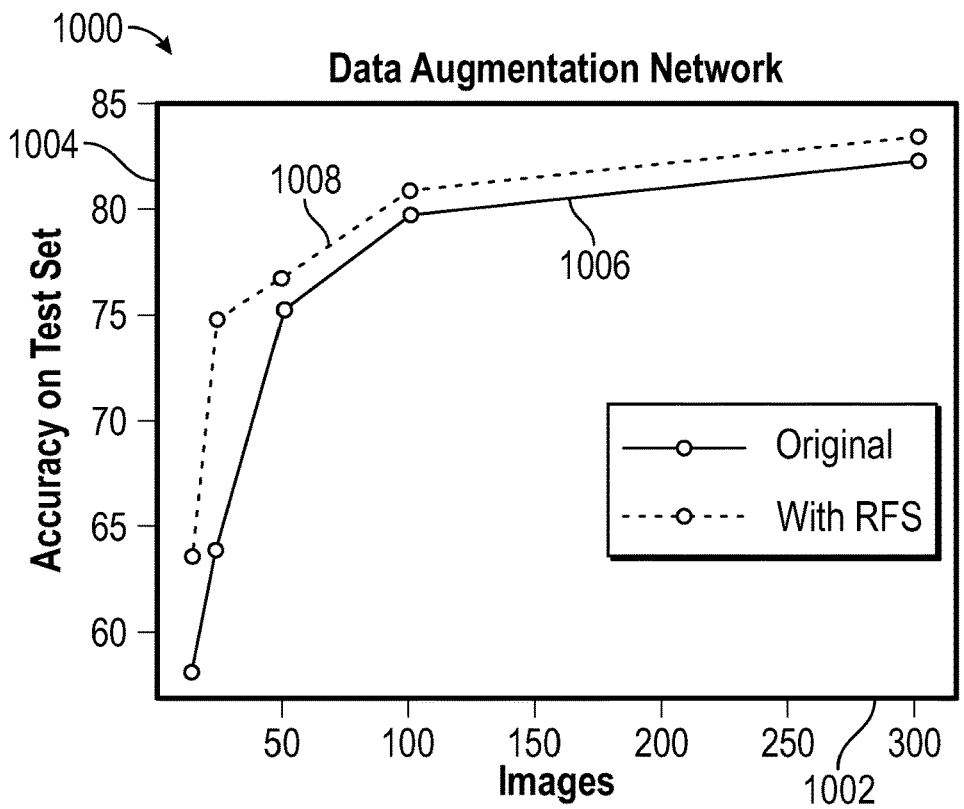
FIG. 10 is a graph illustrating results obtained from experiments performed with one or more embodiments.

FIG. 10 illustrates a graph 1000 with a horizontal axis 1002 representing the total number of images used in test runs with the classifier and a vertical axis 1004 representing test set accuracy for the classifier expressed as percentages. Test set accuracy is measured inference accuracy. Curve 1006 represents a plotting of test set accuracy versus the number of images in test runs for the classifier trained with original images. Curve 1008 represents a plotting of test set accuracy versus the number of images in test runs for the classifier trained with original images plus data produced via random feature selection (RFS). As can be seen the accuracy is greater for curve 1008 than for curve 1006.

Figure 11:
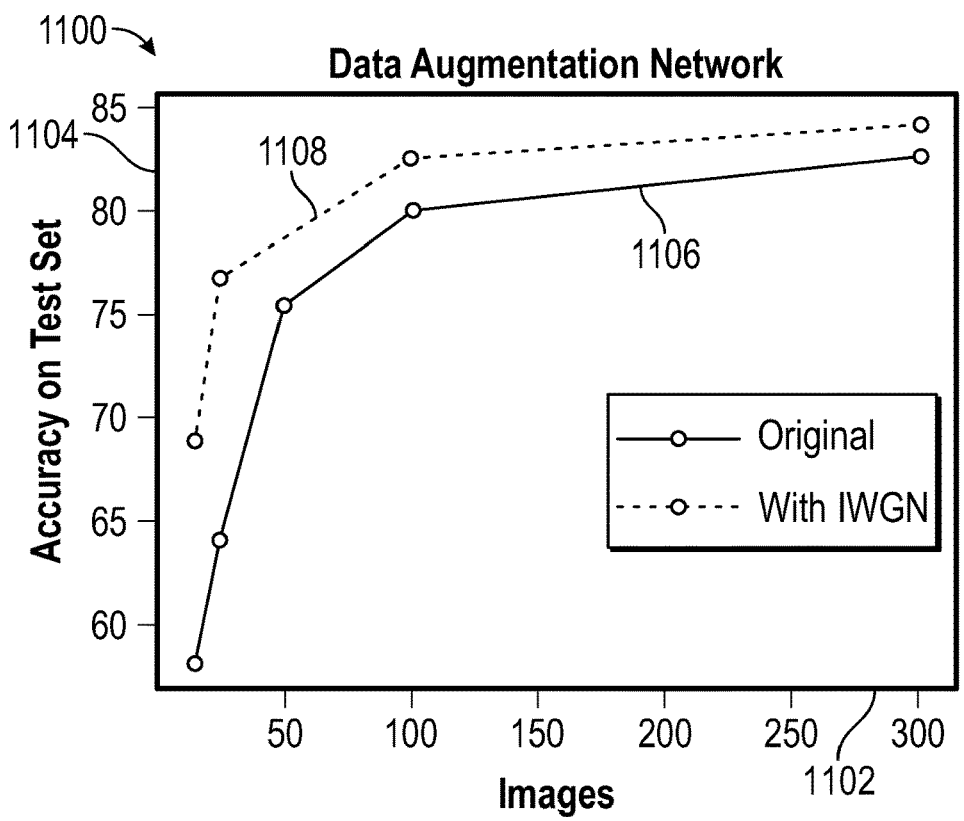
FIG. 11 is a graph illustrating results obtained from experiments performed with one or more embodiments.

FIG. 11 illustrates a graph 1100 with a horizontal axis 1102 representing the total number of images used in test runs with the classifier and a vertical axis 1104 representing test set accuracy for the classifier expressed as percentages. Test set accuracy is measured inference accuracy. Curve 1106 represents a plotting of test set accuracy versus the number of images in test runs for the classifier trained with original images. Curve 1108 represents a plotting of test set accuracy versus the number of images in test runs for the classifier trained with original images plus data produced via injection of additive white Gaussian noise. As can be seen the accuracy is greater for curve 1108 than for curve 1106.

Figure 12:
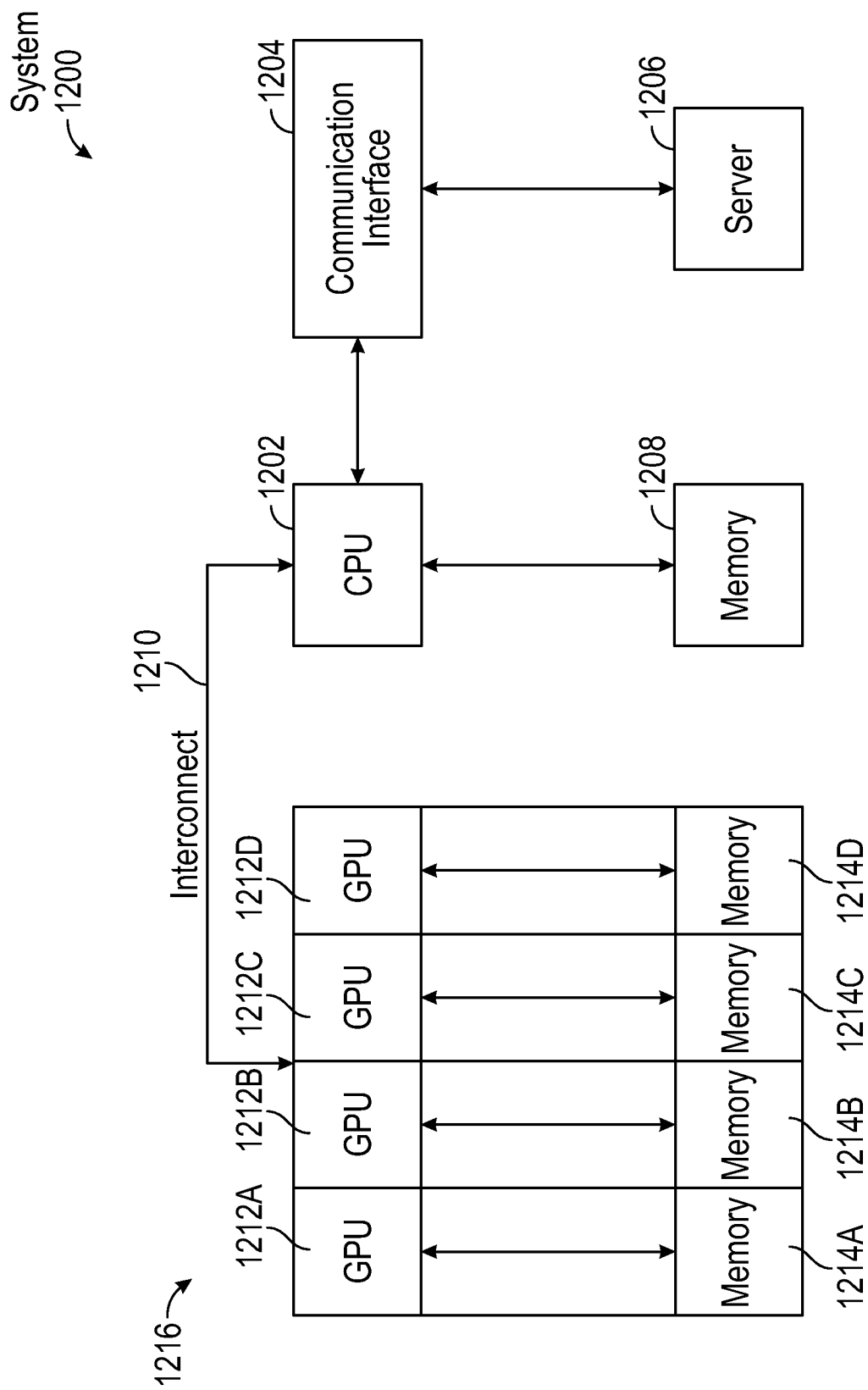
FIG. 12 is a simplified block diagram illustrating an exemplary system for practicing some embodiments.

Referencing FIG. 12, a system 1200 is depicted in which some embodiments may be implemented. System 1200 includes central processing unit (CPU) 1202. In some embodiments, CPU 1202 is one or more multi-core processors. In some more specific embodiments CPU 1202 is an Intel Xeon E5-2698 v4 2.2 GHz processor with 20 cores. In other embodiments CPU 1202 is another type of processor. Other types of processing devices may also be substituted for CPU 1202.

System 1200 also includes memory 1208. In some embodiments memory 1208 is at least one of a flash memory, a hard drive, a random-access memory, or other type of memory. In some more specific embodiments CPU 1202 is a 256 GB LRDIMM DDR4 primary memory.

System 1200 also includes a communication interface 1204 in communication with CPU 1202. System 1200 also includes server 1206. In some embodiments server is an Ubuntu 16.04 server.

System 1200 further includes interconnect 1210 and graphical processing unit (GPU) system 1216. Interconnect 1210 places GPU system 1216 in communication with CPU 1202. GPU system 1216 includes GPU's 1212A-1212D with their associated memories 1214A-1214B. In some embodiments, GPU's 1212A-1212D are four NIVIDIA 4×Tesla V100 GPU's executing at 480 TFLOPS (GPU FP16) on 20,480 NVIDIA CUDA cores. The four 4×Tesla V100 GPU's contain 64 GB total GPU memory corresponding to associated memories 1214A-1214B.

Although some embodiments described below work with images, that is not intended to be limiting. The pattern extractors, data attenuators, generators, and discriminators described herein are not limited to working with image data. Those skilled in the art could apply the teachings herein to other types of data, such as audio data, text data, or other data, without undue experimentation.

Various embodiments are now discussed.

In some embodiments, a computer-implemented method includes training at least a generative adversarial network, the method operable on one or more processers. The method could be implemented for example or one or more of device 101 of FIG. 1A, system 1200 of FIG. 12, or resource-constrained edge device 1300 which is discussed below relative to FIG. 13. In some embodiments, the method is operable with at least one of processing device 130, CPU 1202, processor 1401, Risc processor 1501, or neural processor 1601. In a further example, the generative adversarial network is GAN 110.

The method includes at least a first operation of applying pattern extraction to a set of training data to extract one or more feature embeddings representing one or more features of the training data. For example, in some embodiments processing device 130 accesses memory 135 to execute pattern extractor 120. In these embodiments, pattern extractor 120 accesses dataset 102 to extract feature embeddings 103. In some further embodiments, pattern extractor 120 performs the extracting of the one or more feature embeddings by performing at least one of operations 506, 508, 510, 512, 514, 516, 518, or 520 of FIG. 5A.

The method further includes at least a second operation of attenuating the one or more feature embeddings to create one or more attenuated feature embeddings. For example, in some embodiments processing device 130 accesses memory 135 to execute data attenuator 120. In these embodiments data attenuator accesses feature embeddings to attenuate the feature embeddings to create attenuated data 104. In some further embodiments, data attenuator attenuates the feature embeddings at least in part by performing data attenuation 155 or data attenuation 528. In some further embodiments, data attenuator performs at least one of method 400 or method 450.

The method further includes a third operation of providing the one or more attenuated embeddings to a generator of the generative adversarial network as a condition to at least partly control the generator in generating synthetic data, the providing being performed automatically and dynamically during training of the generator. For example, in some embodiments processing device accesses memory 135 to execute generator 124 while providing the attenuated data 104 to the generator 124 as input. In some further embodiments, processing device 130 performs at least one of operation 157, 207, or 306.

The method further includes a fourth operation of with the generator, generating synthetic data based at least in part on the attenuated embeddings. For example, in some embodiments processing device 130 accesses memory to execute generator 124 to cause generator 124 to generate synthetic data 106. In some further embodiments, generator 124 executes at least one of operations 159, 210, or 307 to generate synthetic data. In some further embodiments, generator 124 performs at least one of operations 530, 532, 534, 536, 538, 540, 542, 544, 546, 548, 550, 552, or 554.

In some embodiments, the method includes wherein at least one of the applying of the first operation or the attenuating of the second operation is performed at least one of automatically during training of the machine learning model or dynamically during training of the machine learning model. For example, processing device 130 accesses memory 135 to execute at least one of the pattern extractor 120 or the data attenuator 121 at least one of automatically during training of the machine learning model or dynamically during training of the machine learning model.

In some embodiments, in the first operation, the pattern extraction is applied to a dataset that includes at least one of image data, auditory data, numerical data, or textual data. That is, in some embodiments the processing device 130 execute pattern extractor 120 to extract data from a dataset 102 that includes at least one of auditory data 141, image data 142, numerical data 143, textual data 144, or sensor data 146.

In some embodiments, the second operation of attenuating the one or more feature embeddings to create one or more attenuated feature embeddings includes at least a first suboperation of stochastically selecting one or more selected feature embeddings from the one or more feature embeddings and at least a second suboperation of retaining the one or more selected feature embeddings as the one or more attenuated feature embeddings. For example, in some embodiments processing device 130 accesses memory 135 to execute at least random feature selector 122 to perform the first suboperation and the second suboperation. In some further embodiments the random feature selector 122, for example, performs the first suboperation of stochastically selecting one or more selected feature embeddings from the one or more feature embeddings at least in part by (1) accepting feature embeddings as input, (2) accessing a stored drop rate, and (3) randomly selecting a subset of the feature embeddings that is sized to be consistent with the drop rate (for example by assigning numbers to the feature embeddings and then using a random number generator to generate a subset of selected numbers, consistent with the drop rate). In some further embodiments random feature selector 122 performs the second suboperation of retaining the one or more selected feature embeddings as the one or more attenuated feature embeddings at least in part by (1) detecting if a given feature embeddings is selected and (2) if not, dropping the feature embedding.

In some embodiments, the second operation of attenuating the one or more feature embeddings to create one or more attenuated feature embeddings includes at least introducing additive white Gaussian noise into the one or more feature embeddings. For example, in some embodiments processing device 130 accesses memory 135 to execute white noise injector 123 to introduce additive white Gaussian noise into the one or more feature embeddings. In some further embodiments white noise injector 123 detects settings for a standard deviation and for a mean for the desired white Gaussian noise, generates the white Gaussian noise consistent with the settings, and mixes the generated white noise with the feature embeddings.

In some embodiments, the method is performed with a set of training data includes at least image training data and the generated synthetic data includes at least synthetic image data.

In some embodiments, the method includes an additional fifth operation of providing data to a discriminator of the generative adversarial network, wherein the data is either data from the set of training data or synthetic data generated by the generator. For example, in some embodiments processing device 130 accesses memory to execute discriminator 125 and provides as input to the discriminator 125 either real data 139 or synthetic data 106. In some further embodiments, the above embodiment further includes an additional sixth operation of with the discriminator determining a probability that the provided data is real data from the training data rather than synthetic data generated by the generator. For example, in some embodiments processing device 130 accesses memory to execute discriminator 125 and cause discriminator 125 to determine a probability that the provided data is real data from the training data rather than synthetic data generated by the generator. In some yet further embodiments the discriminator performs the determining of the probability by performing at least one of operations 556, 558, 560, 562, 564, 566, 568, 570, 572, 574, 576, or 578.

In some embodiments, the method is performed with at least one of a server, a laptop, or an edge device.

In some embodiments the set of training data is a sparse dataset and the method further includes as fifth operation of combining the sparse dataset with synthetic data generated by the generator to create an augmented data set; and a sixth operation of training the discriminator at least in part with the augmented data. For example, in some embodiments processing device 130 accesses memory 135 to perform the fifth operation by combining dataset 102, which is these embodiments is a sparse dataset, with synthetic data 106 generated by the generator to create an augmented data set 107. As a further example, in some embodiments processing device 130 accesses memory 135 to perform operation the sixth operation by at least providing at least a portion of the augmented dataset 107 as input to the discriminator 125 and causing the discriminator 125 to train with the augmented dataset 107. In some embodiments, the data in the augmented dataset has at least one of great variety as compared with the sparse dataset or a greater balance in classes of data as compared with the sparse dataset. In some further embodiments, the method further includes a seventh operation of training the generator with the discriminator that was trained with the augmented dataset. For example, in some embodiments processing device 130 accesses memory 135 to execute discriminator 125 (which was trained with the augmented dataset 107), to execute generator 124 in training, and causing discriminator 125 to train generator 124. In some yet further embodiments, the method includes an eighth operation of with the generator in inference, generating and outputting synthetic data that has application in at least one of security, medicine, or agriculture. For example, in some embodiments processing device 130 access memory to execute generator in inference to output synthetic data that has application in at least one of security, medicine, or agriculture.

In some embodiments, there is a computer-implemented method for generating synthetic data from a sparse dataset, the method operable on one or more processing devices. The method could be implemented for example by one or more of device 101 of FIG. 1A, system 1200 of FIG. 12, or resource-constrained edge device 1300 which is discussed below relative to FIG. 13. In some embodiments the method is operable on at least one of processing device 130, CPU 1202, processor 1401, RISC processor 1501, or neural processor 1601. In some embodiments the sparse dataset is dataset 102 and the generator is generator 124. In discussion of this method, at least some of the discussion of the above previous method is applicable, dependent on context.

The method includes at least a first operation of providing a generative adversarial network (e.g. GAN 110) that includes at least:

a pattern extractor (e.g. pattern extractor 120) that receives the sparse dataset;
a data attenuator (e.g. pattern attenuator 121) linked to the pattern extractor;
a generator linked to the extractor, and
a discriminator (e.g. discriminator 125) linked to the generator.

The method further includes a second operation of extracting, via the pattern extractor, feature embeddings from the sparse dataset. For example, in some embodiments processing device 130 accesses memory 135 to execute pattern extractor 120. In these embodiments, pattern extractor 120 accesses dataset 102 to extract feature embeddings 103.

The method further includes a third operation of attenuating the feature embeddings via the data attenuator to create attenuated data configured to be a condition for the generator. For example, in some embodiments processing device 130 accesses memory 135 to execute data attenuator 120. In these embodiments data attenuator 120 attenuates the feature embeddings 103 to create attenuated data 104 to be a condition for the generator.

The method further includes a fourth operation of generating, with the generator, the synthetic data based on the attenuated data. For example, in some embodiments processing device 130 accesses memory to execute generator 124 to cause generator 124 to generate synthetic data 106 based on the attenuated data 104.

The method further includes a fifth operation of transmitting the synthetic data to the discriminator. For example, in some embodiments processing device 130 accesses memory 135 to provide synthetic data to discriminator 125.

In some embodiments the third operation of attenuating the feature embeddings via the data attenuator to create attenuated data configured to be a condition for the generator includes at least randomly selecting a subset of the feature embeddings. For example, in some embodiments processing device 130 accesses memory 135 to execute random feature selector 122 to cause random feature selector 122 to randomly select a subset of the feature embeddings 103. In some further embodiments the third operation further includes dropping any feature embeddings not selected for the subset. For example, in some embodiments processing device 130 accesses memory 135 to execute random feature selector 122 to cause random feature selector 122 to drop any feature embeddings not selected for the subset.

In some embodiments the third operation of attenuating the feature embeddings via the data attenuator to create attenuated data configured to be a condition for the generator includes at least injecting additive white Gaussian noise into the feature embeddings to create attenuated data. For example, in some embodiments processing device 130 accesses memory 135 to execute white noise injector 123 to cause white noise injector 123 to inject additive white Gaussian noise (e.g. additive white Gaussian noise 208) into the feature embeddings 103 to create attenuated data 104.

In some embodiments the method the extracting and the attenuating are performed automatically during at least one of an training phase or an inference phase. For example, in some embodiments processing device 130 accesses memory 135 to execute at least one of pattern extractor 120 or data attenuator 121, the execution occurring automatically without human intervention and without halting either training or inference.

In some embodiments the method further includes at least automatically transmitting the attenuated data to the generator while the generator is in inference. For example, in some embodiments processing device 130 accesses memory to provide attenuated data 104 to generator 124 while generator 124 is in inference.

In some embodiments the extracting, via the pattern extractor, feature embeddings from the sparse dataset includes at least extracting feature embeddings that are associated with one or more features of data in the sparse dataset.

Part Two

Machine learning applications, including neural networks, differ in how they use computational resources and storage resources. Many machine learning applications are housed in cloud computing systems. These cloud-based computing systems have large computing devices that have access to and that use lots of data.

But there is another environment. For example, some computing devices are located in proximity to sources of data, such as real-time or streamed data, whether from users or from sensors. These may be referred to as edge devices.

The methods described above in this document address the issue of sparse data. But to be most effective in addressing the challenges of real-time and often sparse data, these methods can be practiced in devices that are designed to be in proximity to the sources of data, again, whether users or sensors. One approach to the above challenges is an edge device, such as an IoT device or other resource-constrained edge device, that is configured to be deployed in proximity to sources of data.

In providing a resource-constrained edge device, there are various possible design considerations. None of these possible design considerations are necessarily applicable to all or even a majority of embodiments.

One possible design consideration for some embodiments is to bring computing devices running machine learning algorithms closer to the sources of data. This improves response times and saves bandwidth, but also results in some challenges. For example, there may be reduced computing power, less storage capacity, and smaller often sparse datasets.

Another possible design consideration for some embodiments is to receive incoming real-time data and to integrate this incoming data into the machine learning.

Another possible design consideration is the extent to which a resource-constrained edge device is lower power and suitable for operating for extended periods of time.

Another possible design consideration is the extent to which a resource-constrained edge device is capable of executing the methods previously described in this document, despite having limited processing power and limited data storage capabilities.

Another possible design consideration is the extent to which a resource-constrained edge device is capable of performing both training and inference.

Another possible design consideration is the extent to which a resource-constrained edge device is capable of storing in resident memory at least a reduced-size trained model for at least inference.

In some embodiments, an edge device is configured to execute machine learning procedures with a sparse dataset. The edge device includes at least (1) one or more sensor interfaces, (2) one or more microcontrollers (MCUs), and one or more memories in communication with the one or more microcontrollers. The one or more memories contain one or more executable instructions that cause the one or more microcontrollers to perform operations that include at least: (a) receiving one or more batches of real-time sensor data via the one or more sensor interfaces, the one or more batches defining the sparse dataset, creating one or more batches of augmented data with the one or more batches of real-time sensor data and one or more batches of generated synthetic data, and training a machine learning procedure using the augmented data. In some embodiments the edge device is a resource-constrained edge device.

Figure 13:
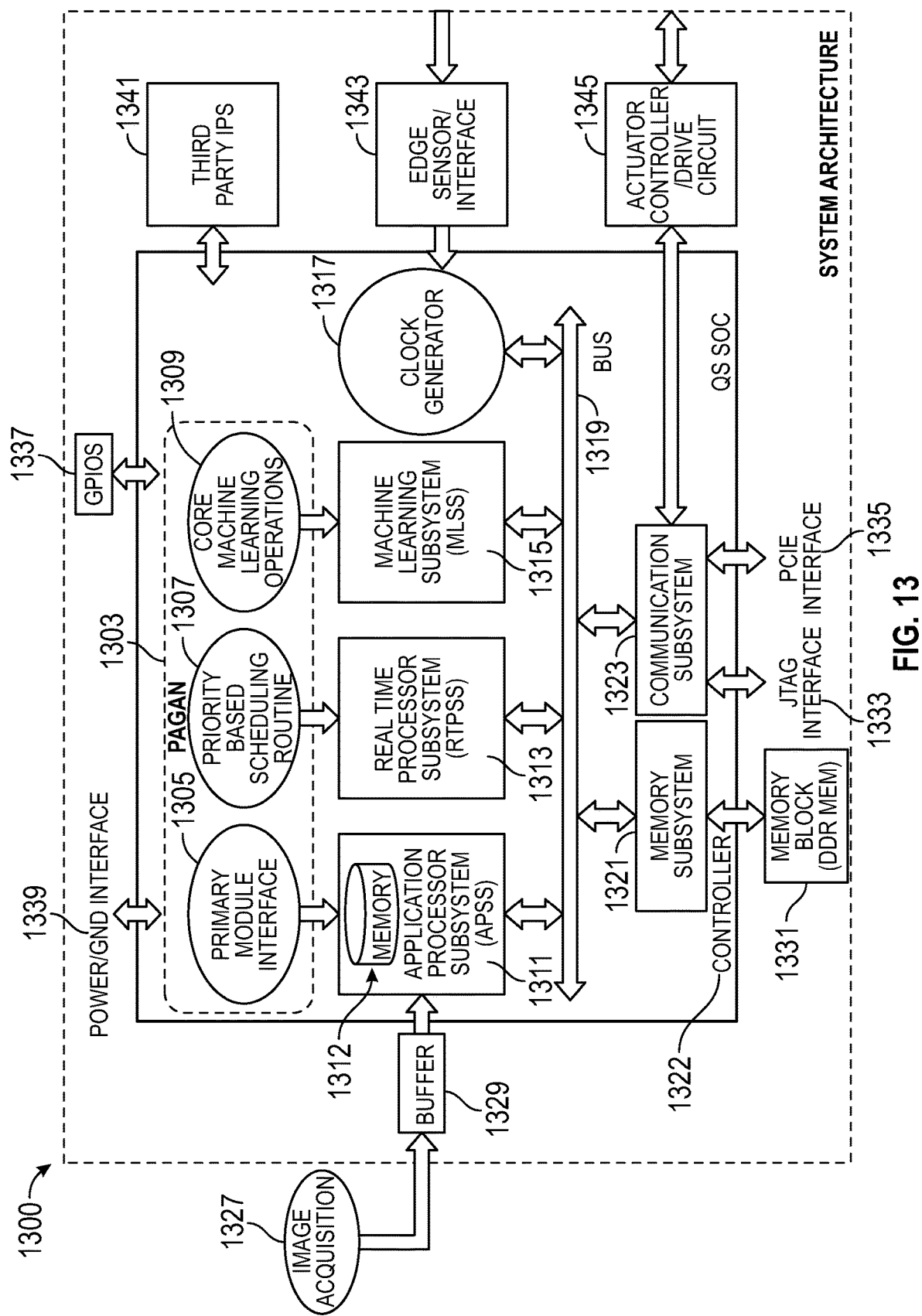
FIG. 13 is a simplified block diagram illustrating a resource-constrained edge device with which some embodiments may be practiced.

Referencing FIG. 13, a resource-constrained edge device 1300 is depicted in simplified block diagram form. In some embodiments, device 1300 is an IoT device. In some embodiments device 1300 is configured to be deployed in proximity to sensors, such as for example, sensors on IoT devices.

Device 1300 is capable of performing both training and inference. Device 1300 includes an Application Processor Subsystem (APSS) 1311 that includes at least a resident memory 1312. Device 1300 further includes a real-time processor subsystem (RTPSS) 1313 and a machine learning subsystem (MLSS) 1315. Device 1300 further includes a bus 1319 that is in communication with each of APSS 1311, RTPSS 1313, and MLSS 1315. In some embodiments the bus 1319 is a central ICM (interconnect matrix). Device 1300 further includes a clock generator 1317 in communication with bus 1319.

Device 1300 further includes a pattern-aware generative adversarial network program (PAGAN program 1303), which in some embodiments includes executable instructions and which controls the hardware of blocks 1305, 1307, and 1309. The PAGAN program 1303 is stored in resident memory 1312. The PAGAN program 1303 includes a primary module interface 1305 for executing on APSS 1311 and linking APSS 1311 to other resources or components of Device 13100, a priority-based scheduling routine 1307 for executing on RTPSS 1313, and a core machine learning operations routine 1309 for executing on MLSS 1315.

Device 1300 further includes communication subsystem 1323 in communication with bus 1319. In some embodiments communication subsystem 1323 includes a direct memory access engine (not shown). In some embodiments communication subsystem 1323 also includes, or is in communication with, a JTAG interface 1333 and a PCIe (Peripheral Component Interconnect Express) interface 1335.

In some embodiments APSS 1311 of device 1300 is configured to access images via an image acquisition circuit 1327 via a buffer 1329. APSS 1311 transfers these images via bus 1319 to memory subsystem 1321 where the images may be transferred to external memory 1331.

Device 1300 further includes a memory subsystem 1321 in communication with bus 1319. In some embodiments this memory subsystem 1321 is shared among APSS 1311, RTPSS 1313, and MLSS 1315. Memory subsystem 1321 includes one or more of a hard drive memory, a flash memory, a random access memory, or other memory type. In some embodiments memory subsystem includes limited storage capacity. In some embodiments the storage capacity of memory subsystem is less than 8 MB. In some embodiments, the storage capacity of memory subsystem 1323 is less than 4 MB. In some embodiments memory subsystem 1313 can store a trained model, such as for example a trained model of 3.2 MB. Memory subsystem 1321 includes, or is in communication with, memory controller 1322.

In some embodiments memory subsystem 1321 is in communication with, via controller 1322, an external memory 1331 that is external to device 1300. In some embodiments, external memory 1331 is a DDR (double-data-rate) memory. Memory controller 1322 controls the external memory 1331. Training weights are stored on external memory 1331. Also, input data, for example additional images arriving via buffer 1329, is pushed out to external memory 1331. External memory 1331 is also a limited storage memory. For example, in some embodiments external memory 1331 has insufficient capacity to store an entire generated training dataset.

Memory controller 1322 coordinates memory subsystem 1321 and external memory 1322. For example, during training generated training data is processed in batches. As a first batch of training data is generated, the memory controller 1322 causes the first batch to be stored in the external memory 1331. After a second batch of training data is generated, the memory controller 1322 causes the second batch of training data to be stored in external memory 1331 while overwriting the first batch of training data.

In some embodiments, during inference, for example while executing the operations of inference model 590 of FIG. 5A, the memory controller 1322 causes the trained model to be initially stored in external memory 1331. As inference proceeds, the trained model is swapped from external memory 1331 in and out of memory subsystem 1321. A smaller size for a trained model reduces overhead of fetching to and from external memory 1331 into memory subsystem 1321.

Device 1300 also includes Power/Ground (GND) interface 1339 and general purpose input/outputs (GPIOs) 1337. In some embodiments Device 1300 includes, or is in communication with, a number of interfaces that can include a third party Internet Protocol (IP) interface 1341 and an edge sensor interface 1343 for receiving data from edge sensors. Bus 1319 is in communication with an control circuitry 1345 which may be one or more of an actuator, a controller, or a driver circuit.

Figure 14:
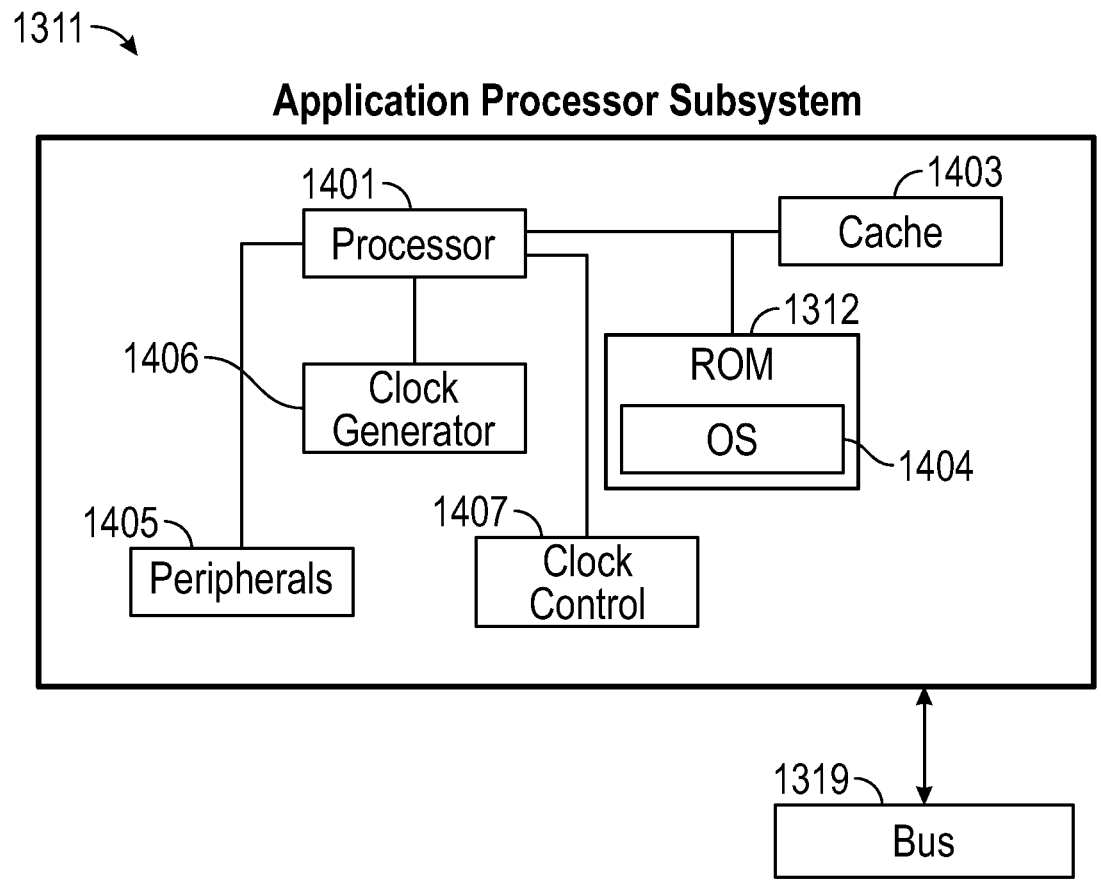
FIG. 14 is a simplified block diagram of an application processor subsystem which is a part of the resource-constrained edge device of FIG. 13.

Referencing FIGS. 13 and 14, in some embodiments the APSS 1311 includes an application processor 1401 in communication with a cache memory 1403 and the resident memory 1312. The resident memory 1312 in some embodiments is a read-only memory. Resident memory 1312 stores the operating system, for example a Linux kernel and also stores a PAGAN program 1303. Other components of APSS 1311 include peripherals 1405, a clock generator 1406, and a clock control 1407. The primary purposes of the APSS 1311 are to boot the operating system 1404, invoke the RTPSS 1313 and the MLSS 1315, and to manage data for machine learning. The APSS 1311 is in communication with bus 1319.

Figure 15:
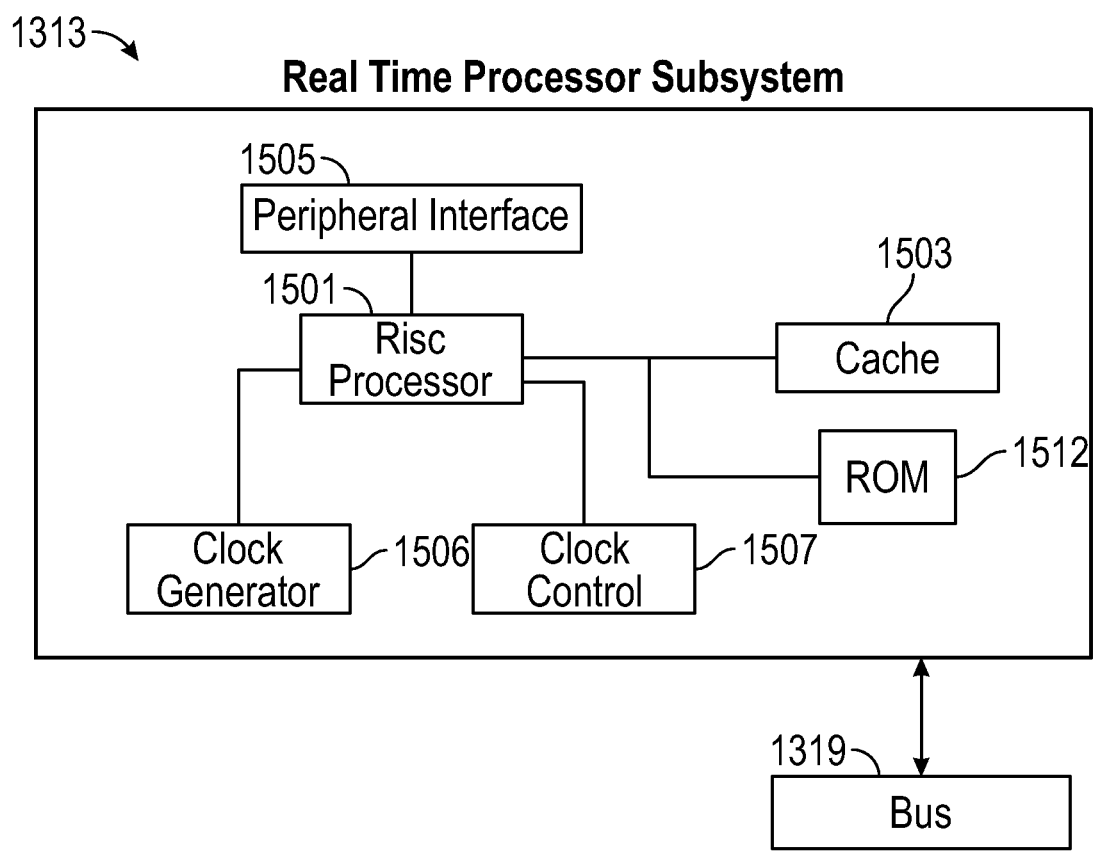
FIG. 15 is a simplified block diagram of a real-time processor subsystem which is a part of the resource-constrained edge device of FIG. 13.

Referencing FIGS. 13 and 15, in some embodiments the RTPSS 1313 includes a RISC (reduced instruction set computer) processor 1501, a cache memory 1503, and a read-only memory 1512. The RISC processor 1501 is communication with both the cache memory 1503 and the read-only memory 1512. In some embodiments, the cache memory is "on-chip" cache memory and is part of RISC processor 1501. RISC processor 501 is also in communication with clock generator, 1506, clock control 1507, and a peripheral interface 1505—wherein all of which are part of RTPSS 1313. The primary purpose of the RTPSS 1313 is to receive and to process real-time sensor data.

Figure 16:
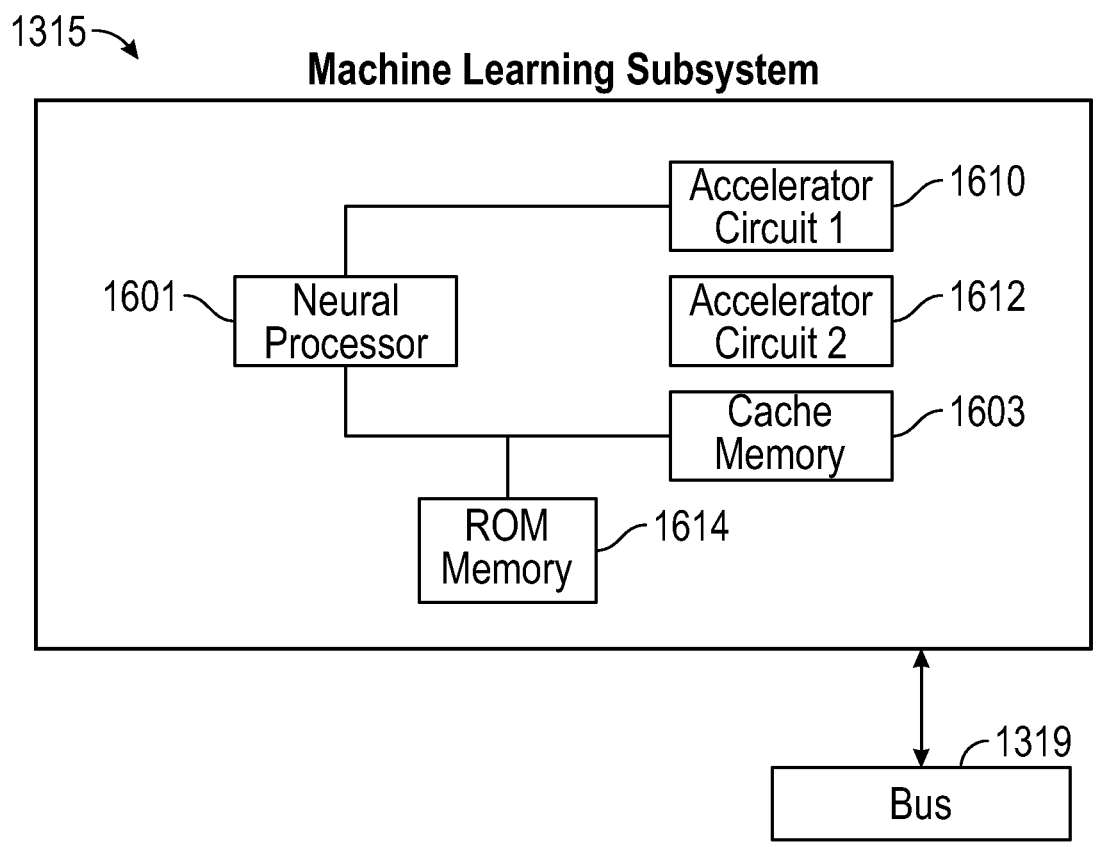
FIG. 16 is a simplified block diagram of a machine-learning subsystem which is a part of the resource-constrained edge device of FIG. 13.

Referencing FIGS. 13 and 16, in some embodiments the MLSS 1315 includes a neural processor 1601 and a plurality of accelerator circuitries 1610, 1612. Neural processor 1601 is also in communication with cache memory 1603 and read-only (ROM) memory 1614, which are both part of MLSS 1315. Cache memory 1603 may also be "on-chip" cache memory and be part of neural processor 1601. The primary purpose of MLSS 1315 is to serve as an accelerator for performing many of the mathematical computations for machine learning such as matrix multiplication and accumulation, vector operations, and others.

All three subsystems APSS 1311, RTPSS 1313, and MLSS 1315, are used for generating training dataset generation and during training with training datasets. In inference, for example when executing only inference model 590 of FIG. 5A, the MLSS 1315 is not used. Instead at least one of the APSS 1311 or RTPSS 1313 are applied.

Figure 17:
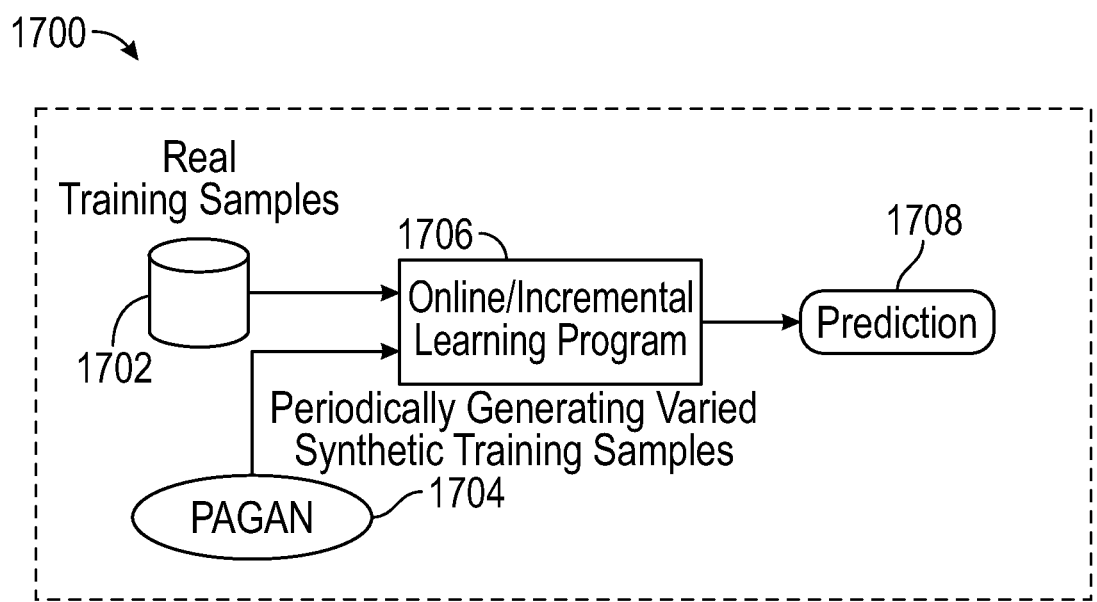
FIG. 17 is a flow diagram illustrating a method of generating a prediction, consistent with some embodiments

Referencing FIG. 17, a method 1700 of training an online/incremental learning program is presented. As used herein, an online/incremental learning program includes a program for causing a deep learning model to be adapted to a changing environment, such as where training data is dynamic and changing dependent on one or more environmental parameters. For example, online/incremental learning is applicable where an entire dataset of training data is not available at once but is instead training data is received in parts, in real-time, such as data from active sensors or from users.

Method 1700 includes, in operation 1702, obtaining real training samples and transmitting the real training samples to an online/incremental learning program. These training samples are real data from the environment. For example, real data may be obtained from sensors or as input by users.

In operation 1704, the pattern-aware generative adversarial network program (PAGAN) program 1303 generates synthetic data, that is PAGAN program 1303 periodically generates additional and varied synthetic training samples for the online/incremental learning program. In operation 1706, the online/incremental learning program is trained with a combination of the real training samples and the varied synthetic training samples.

And in operation 1708, the incremental learning program issues a prediction. The prediction could be about whether, for example, an image has a feature such as a key face, as discussed below in reference to FIG. 18. A result of the above is that an online/incremental learning program is trained using a sparse data regime.

Figure 18:
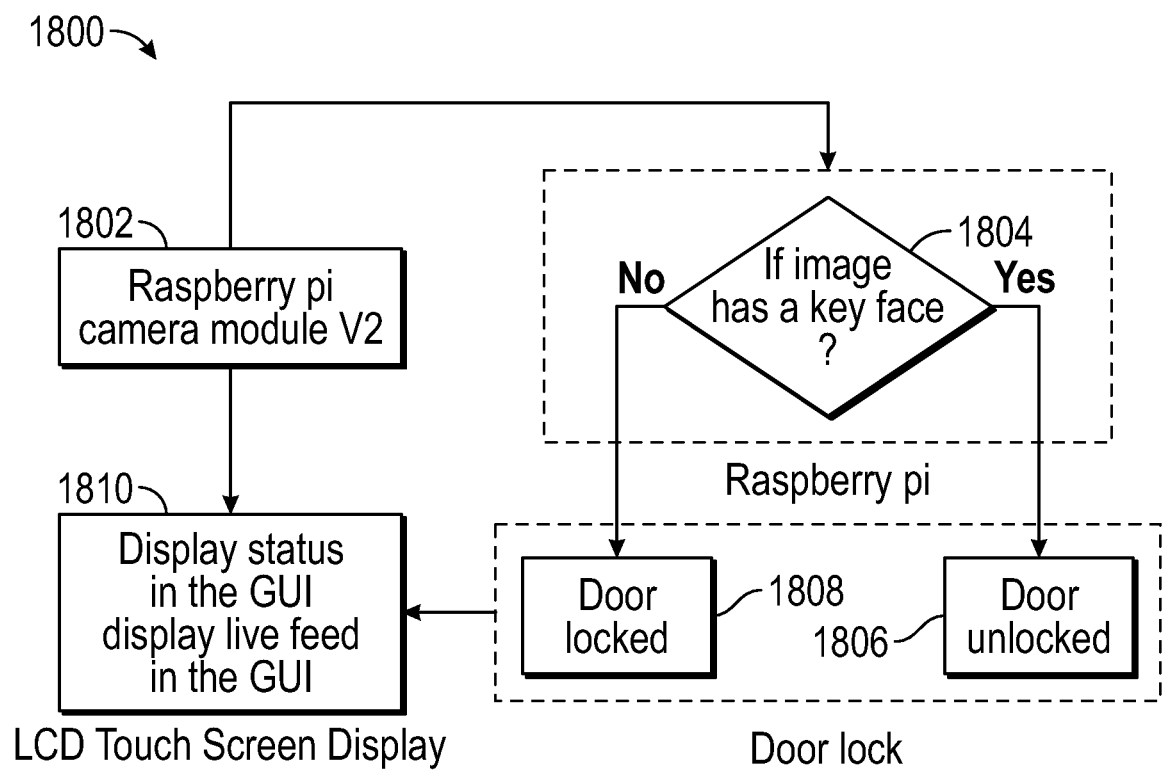
FIG. 18 is a flow diagram illustrating a method of operating a door lock, consistent with some embodiments.

Referencing FIG. 18, a flow diagram illustrates a method 1800 of electronically and automatically locking or unlocking a door lock. In operation 1804, Method 1800 utilizes one or more computing devices configured with an trained online/incremental learning model that was trained at least similarly to the method 1700 of FIG. 17.

In operation 1802, the one or more computing devices, such as for example device 1300, instruct a camera, such as a Raspberry Pi Camera Module 2, to capture one or more images, for example, of a door. The number of images captured is small. Thus, this likely presents a sparse data situation. The one or more computing devices transmit these captured images to a graphical user interface (GUI) for display of a live imaging feed of a door.

The one or more computing devices also transmit these captured images to the online/incremental learning model that has been trained based on a combination of real images, such as those taken by the camera, and synthetic data, such as those generated by a generator of a PAGAN program.

In operation 1804, the trained online/incremental learning model makes a prediction, similar to making a prediction in operation 1708 of FIG. 17. Specifically, in operation 1804 the online/incremental learning model makes a prediction about whether am image has a key face of a door lock. In some embodiments, this prediction is of a probability that the image has a key face.

If yes, the control passes to operation 1806 and a signal is transmitted unlocking a door. If no, control passes to operation 1808 and a signal is transmitted locking a door or keeping the door locked. In operation 1810, regardless of whether the door is locked, a live feed of an image of the door is displayed on a graphical user display (GUI) based on receipt of the images from the one or more computing devices.

As discussed above, some embodiments can be used to work on the fly with sparse data generated by users or by sensors. In particular, some embodiments can be used with online/incremental learning models. For example, if a group of sensors intermittently transmit small batches of data, these small batches of data may be supplemented by a varied set of synthetic data produced by a PAGAN program. As a batch of real data is received or as a batch of synthetic training data is produced by the PAGAN program, these first batches of data may be stored in memory of a resource-constrained device which can overwrite one or more previous batches of data to conserve storage capacity. Thus, a steady stream of real-time data may be supplemented with a batch synthetic data on the fly and then the combined batch of data. And the above can be managed on a resource-constrained edge device by overwriting previous batches of data when storing new batches of data.

Other potential uses for the technologies described herein are numerous. Below are some examples.

Some embodiments could be trained to generate CAPTCHA's with the generator in inference mode. CAPTCHA's could be generated for smartphones, smartcard readers, and generic handheld devices such as point-of-sale devices (POS).

Some embodiments could be trained to generate images for identity concealing, such as by generating real-looking, but not identical text.

Some embodiments can be trained to enrich existing training datasets by adding similar but different synthetic data. This could at least partly resolve issues with class imbalance problems and scarcity of data problems.

In farming, farmers could use handheld devices to capture images of pests on crops. These images of the pests would be sparse data. Some embodiments could input the sparse data and supplement the sparse data to create augmented training datasets for training a classifier to correctly identify the pests.

In medicine, medical providers could similarly use handheld devices to capture images of possible disease or health conditions. These images would be sparse data because only a small number of images would normally be captured. Some embodiments could input the sparse data and supplement the sparse data to create augmented training datasets for training a classifier to correctly identify the disease or health conditions.

Various embodiments are now discussed.

In some embodiments an edge device, such as for example resource-constrained edge device 1300, is configured to execute machine learning procedures with a sparse dataset, such as for example dataset 102.

The edge device includes at least one or more sensor interfaces, such as for example edge sensor interface 1343.

The edge device further includes at least one or more microcontrollers (MCUs), such as for example one or more of APSS 1311, RTPSS 1313, or MLSS 1315.

The edge device further includes at least one or more memories in communication with the one or more microcontrollers. In some embodiments, the one or more memories include at least one of memory subsystem 1321 or memory 1312. In some embodiments the one or more memories contain one or more executable instructions, such as for example executable programs 137, that cause the one or more microcontrollers to perform operations that include at least:

a. receiving one or more batches of real-time sensor data, such as for example sensor data 146, via the one or more sensor interfaces, the one or more batches defining the sparse dataset, such as for example dataset 102;

b. creating one or more batches of augmented data, such as for example augmented dataset 107, with the one or more batches of real-time sensor data and one or more batches of generated synthetic data, such as for example synthetic data 106 c. training a machine learning procedure using the augmented data.

In some embodiments the edge device is a resource-constrained edge device, such as for example resource-constrained edge device 1300. In some embodiments, the resource-constrained edge device is configured to perform both training and inference.

In some embodiments the one or more memories contain limited storage of less than 32 MB. In some further embodiments, the limited storage memories are configured to store at least a trained inference model.

In some embodiments the one or more memories include at least a memory controller, such as for example memory controller 1322, and the one or more memories are in communication, via the memory controller, with an external memory, such as for example memory block 1331, that is external to the edge device.

In some embodiments the one or more microcontrollers include at least one of:

(a) at least one microcontroller, such as for example APSS 1311, configured to at least (1) boot an operating system and (2) activate at least one other microcontroller;

(b) at least one microcontroller, such as for example RTPSS, configured to receive sensor data via the one or more sensor interfaces; or (c) at least one microcontroller, such as for example MLSS 1315, configured to perform at least machine learning mathematical operations.

In some embodiments, the one or more executable instructions further cause the one or more microcontrollers to an additional operation of training a machine learning model with the one or more batches of augmented data. For example, in some embodiments the one or more executable instructions cause a discriminator 125 to perform operation 172 in which the discriminator 125 trains with the augmented data set 107.

In some embodiments, one or more executable instructions further cause the one or more microcontrollers to (1) store a first batch of augmented data (e.g. augmented data 107) in an external memory (e.g. external memory 1331) associated with the one or more memories and (2) to store a second batch of augmented data in the external memory, the storing of the second batch overwriting the first batch.

In some embodiments receiving one or more batches of real-time sensor data includes a least receiving as the one or more batches of real time sensor data one or more batches of at least one of audio data (e.g. auditory data 141), image data (e.g. image data 142), numerical data (e.g. numerical data 143) or text data (e.g. textual data 144).

In some embodiments, one or more executable instructions further cause the one or more microcontrollers to at least one of automatically or dynamically extracting one of more feature embeddings for at least one batch of received real-time sensor data. For example, in some embodiments the extracting is performed automatically without user intervention or input. As a further example, in some embodiments the extracting is performed dynamically (e.g. on-the-fly) during execution of one or more executable programs 137 without pausing or halting said execution.

In some embodiments, one or more executable instructions further cause the one or more microcontrollers to perform an attenuation operation of at least attenuating the one or more feature embeddings and providing the attenuated data to a generator for generation of synthetic images.

In some further embodiments, the above attenuating operation is performed by at least one of the following: (a) randomly selecting a set of selected feature embeddings to create attenuated data and discarding the non-selected feature embeddings, (b) providing the attenuated data to a generator of a generative adversarial network, and (c) generating, with the generator, at least some of the synthetic data.

In some further embodiments, the above attenuating operation is performed by at least one of the following (a) injecting the feature embeddings with additive white Gaussian noise to create attenuated data, (b) providing the attenuated data to a generator of a generative adversarial network, and (c) generating, with the generator, at least some of the synthetic data.

In some embodiments a mobile handheld computing device that is configured to execute machine learning procedures with a sparse dataset.

The mobile handheld computing device includes at least a receiver, such as for example communication interface 128. The receiver is configured to receive at least data.

The mobile handheld computing device further includes at least one or more processing devices. In some embodiments, the one or more processing devices include at least processing device 130. In some embodiments, the one or more processing devices include at least one of APSS 1331, RTPSS 1313, or MLSS 1315.

The mobile handheld computing device further includes at least one or more memories (e.g. memory 135) in communication with the one or more processing devices. The one or more memories contain one or more executable instructions (e.g. executable programs 137). These executable instructions configure the one or more processing devices to perform operations that include at least (a) receiving the sparse data via the receiver from one or more mobile devices, (b) creating augmented data with the sparse data and generated synthetic data, and (c) training one or more machine learning models with the augmented data, wherein the augmented data has a greater variety of features compared with the sparse data.

In some embodiments the received sparse data received from one or more mobile devices includes at least one of images, audio files, or text files.

In some embodiments, the operation of creating augmented data with the sparse data and generated synthetic data includes at least (1) with a pattern extractor, extracting one or more feature embeddings from the sparse data and (2) with a data attenuator, attenuating the one or more feature embeddings to create attenuated data, and (3) providing the attenuated data as a condition to a generator of a generative adversarial network, and (4) with the generator, generating the synthetic data based at least in part on the attenuated data.

In some embodiments, the operation of training one or more machine learning models with the augmented data includes at least (1) training a discriminator of a generative adversarial network with the augmented data and (2) training a generator of the generative adversarial network at least in part with the trained discriminator.

In some embodiments a resource-constrained edge device, such as for example resource-constrained edge device 1300, is configured to execute machine learning procedures with a sparse dataset, such as for example dataset 102.

The resource-constrained edge device includes at least one or more sensor interfaces, such as for example edge sensor interfaces 1343.

The resource-constrained edge device includes at least one or more microcontrollers (MCUs), such as at least one of APSS 1311, RTPSS 1313, or MLSS 1315.

The resource-constrained edge device includes one or more memories, such as for example at least one of memory 1321 or memory 1312. The one or more memories are in communication with the one or more microcontrollers. Further, the one or more memories contain one or more executable instructions that cause the one or more microcontrollers to perform operations that include at least (a) receiving one or more batches of real-time sensor data via the one or more sensor interfaces, the one or more batches defining the sparse dataset, (b) creating one or more batches of augmented data with the one or more batches of real-time sensor data and one or more batches of generated synthetic data, and (c) training at least a discriminator at least in part with the one or more batches of augmented data.

In some embodiments the resource-constrained edge device is an Internet of Things (IoT) device.

I will be understood by those skilled in the art that the terminology used in this specification and in the claims is "open" in the sense that the terminology is open to additional elements not enumerated. For example, the word "includes" should be interpreted to mean "including at least" and so on. Even if "includes at least" is used sometimes and "includes"

is used other times, the meaning is the same: includes at least. In addition, articles such as "a" or "the" should be interpreted as not referring to a specific number, such as one, unless explicitly indicated. At times a convention of "at least one of A, B, or C" is used, the intent is that this language includes any combination of A, B, C, including, without limitation, any of A alone, B alone, C alone, A and B, B and C, A and C, all of A, B, and C or any combination of the foregoing, such as for example AABBC, or ABBBCC. The same is indicated by the conventions "one of more of A, B, or C" and "and/or".

Although embodiments have been described in detail, it should be understood that various changes, substitutions, and alterations could be made hereto without departing from the spirit and scope of the invention as defined by the appended claims and equivalents thereof.

We claim:

1. A computer-implemented method includes training at least a generative adversarial network, the method operable on one or more processors, the method comprising:
   receiving a set of training data comprising elements of multi-valued data where each element of multi-valued data is independent and unrelated to other elements of multi-valued data;
   applying pattern extraction to the set of training data to extract one or more feature embeddings representing one or more features of the training data, the feature embeddings comprising subsets of the multi-valued data;
   attenuating the one or more feature embeddings to create one or more attenuated feature embeddings;
   providing the one or more attenuated embeddings to a generator of the generative adversarial network as a condition to at least partly control the generator in generating synthetic data, the providing being performed automatically and dynamically during training of the generator;
   with the generator, generating synthetic data based at least in part on the attenuated embeddings; and
   a discriminator performing a discrimination of the synthetic data and the training data comprising a convolution of the synthetic data with the training data to generate a probability indicating whether to use or discard the synthetic data.

2. The computer-implemented method of claim 1, wherein at least one of the applying or the attenuating is performed at least one of automatically during training of the machine learning model or dynamically during training of the machine learning model.

3. The computer-implemented method of claim 1, wherein the training data comprises at least one of image data, auditory data, numerical data, or textual data.

4. The computer-implemented method of claim 1, wherein the attenuating the one or more feature embeddings to create one or more attenuated feature embeddings comprises:
   stochastically selecting one or more selected feature embeddings from the one or more feature embeddings; and
   retaining the one or more selected feature embeddings as the one or more attenuated feature embeddings.

5. The computer-implemented method of claim 1, wherein the attenuating the one or more feature embeddings to create one or more attenuated feature embeddings includes at least introducing additive white Gaussian noise into the one or more feature embeddings.

6. The computer-implemented method of claim 1, wherein the set of training data includes at least image training data and wherein the generated synthetic data includes at least synthetic image data.

7. The computer-implemented method of claim 1 where performing the discrimination comprises an operation conv2D(32)+Do(0.5)+LReLU, and conv2D(32), and where Do(0.5) is a PyTorch "dropout" operation and conv2D(32) and LRelu are Python PyTorch package functions.

8. The computer-implemented method of claim 1, where the discriminator also determines a probability that the provided data is real data from the training data rather than synthetic data generated by the generator.

9. The computer-implemented method of claim 1, wherein the method is performed with at least one of a server, a laptop, or an edge device.

10. The computer-implemented method of claim 1, wherein the set of training data is a sparse data set and wherein the method further comprises:
    combining the sparse dataset with synthetic data generated by the generator to create an augmented data set; and
    training the discriminator at least in part with the augmented data.

11. The computer-implemented method of claim 10, wherein data in the augmented dataset has at least one of great variety as compared with the sparse dataset or a greater balance in classes of data as compared with the sparse dataset.

12. The computer-implemented method of claim 11, further comprising:
    training the generator with the discriminator that was trained with the augmented dataset.

13. The computer-implemented method of claim 12, further comprising:
    with the generator in inference, generating and outputting synthetic data that has application in at least one of security, medicine, or agriculture.

14. A computer-implemented method includes training at least a generative adversarial network on a sparse singular dataset of unpaired values, the method operable on one or more processors, the method comprising:
    providing a generative adversarial network that includes at least:
       a pattern extractor that receives the sparse dataset;
       a data attenuator linked to the pattern extractor;
       a generator linked to the extractor, and
       a discriminator linked to the generator;
    extracting, via the pattern extractor, feature embeddings from the sparse dataset;
    attenuating the feature embeddings via the data attenuator to create attenuated data configured to be a condition for the generator;
    generating, with the generator, the synthetic data based on the attenuated data;
    transmitting the synthetic data to the discriminator;
    the discriminator comparing the synthetic data and the sparse dataset and using a convolution of the synthetic data with the sparse dataset to generate a probability value indicating similarity of the synthetic dataset to the sparse dataset.

15. The computer-implemented method of claim 14, wherein the attenuating the feature embeddings via the data attenuator to create attenuated data configured to be a condition for the generator comprises:
    randomly selecting a subset of the feature embeddings from a plurality of available feature embeddings.

16. The computer-implemented method of claim 15, wherein the attenuating the feature embeddings via the data attenuator to create attenuated data configured to be a condition for the generator further comprises:
  dropping any feature embeddings not selected for the subset of the feature embeddings.

17. The computer-implemented method of claim 14, wherein the attenuating the feature embeddings via the data attenuator to create attenuated data configured to be a condition for the generator comprises:
  injecting additive white Gaussian noise into the feature embeddings to create attenuated data.

18. The computer-implemented method of claim 14, wherein the extracting and the attenuating are performed automatically during at least one of an training phase or an inference phase.

19. The computer-implemented method of claim 14, further comprising:
  automatically transmitting the attenuated data to the generator while the generator is in inference.

20. The computer-implemented method of claim 14, wherein the extracting, via the pattern extractor, feature embeddings from the sparse dataset comprises:
  extracting feature embeddings that are associated with one or more features of data in the sparse dataset.

21. The computer-implemented method of claim 14, wherein the training dataset is image data and feature embeddings have white noise applied in a manner which spatially modifies and distorts the feature embeddings to different spatial locations.

\* \* \* \* \*